US009756223B2

(12) United States Patent
Soriano et al.

(10) Patent No.: US 9,756,223 B2
(45) Date of Patent: Sep. 5, 2017

(54) SYSTEM AND METHOD TO ENSURE UNIFORM LEVEL OF COLOR OF A DISTRIBUTED PRINT JOB AMONG MULTIPLE PRINTERS IN A PRINT SHOP

(71) Applicant: KONICA MINOLTA LABORATORY U.S.A., INC., San Mateo, CA (US)

(72) Inventors: Randy Cruz Soriano, San Leandro, CA (US); Kenneth Huang Young, San Mateo, CA (US); Kazuto Yamamoto, Foster City, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 15/474,425

(22) Filed: Mar. 30, 2017

(65) Prior Publication Data
US 2017/0208217 A1 Jul. 20, 2017

Related U.S. Application Data

(63) Continuation-in-part of application No. 14/982,637, filed on Dec. 29, 2015, now Pat. No. 9,667,838.

(51) Int. Cl.
*H04N 1/60* (2006.01)
*H04N 1/32* (2006.01)
(Continued)

(52) U.S. Cl.
CPC .......... *H04N 1/6055* (2013.01); *G06F 3/126* (2013.01); *G06F 3/1208* (2013.01);
(Continued)

(58) Field of Classification Search
None
See application file for complete search history.

(56) References Cited

U.S. PATENT DOCUMENTS

| 5,859,711 | A | 1/1999 | Barry |
| 6,035,103 | A | 3/2000 | Zuber |
| 6,707,563 | B1 | 3/2004 | Barry |
| 6,856,416 | B1 | 2/2005 | Danknick |
| 7,046,391 | B1 | 5/2006 | Barry |
| 7,352,491 | B2 | 4/2008 | Bala |

(Continued)

FOREIGN PATENT DOCUMENTS

JP 2010-19732 1/2010

*Primary Examiner* — Scott A Rogers
(74) *Attorney, Agent, or Firm* — Buchanan Ingersoll & Rooney PC

(57) ABSTRACT

A server, system, and method are disclosed for ensuring uniform level of color of distributed print jobs, wherein each of the plurality of printers is configured to conduct color validation and/or color calibration based on a first criterion. The server having a processor configured to: receive, from a client computer, a request relating to a print job; determine whether the received print job is a split job, which can be split amongst the plurality of the printers; filter at least two printers each having an in-line spectrophotometer from the plurality of printers; and instruct to the each filtered at least two printers so that color validation and/or color calibration is performed based on a second criterion by using the in-line spectrophotometer, wherein the second criterion causes color validation and/or color calibration at each of the each filtered at least two printers to be performed earlier than the first criterion.

20 Claims, 29 Drawing Sheets

(51) Int. Cl.
*H04N 1/00* (2006.01)
*G06F 3/12* (2006.01)
*G06K 15/02* (2006.01)
*H04N 1/23* (2006.01)

(52) U.S. Cl.
CPC .......... *G06F 3/1215* (2013.01); *G06F 3/1217* (2013.01); *G06F 3/1241* (2013.01); *G06F 3/1261* (2013.01); *G06F 3/1288* (2013.01); *G06K 15/027* (2013.01); *G06K 15/1859* (2013.01); *G06K 15/1878* (2013.01); *H04N 1/00034* (2013.01); *H04N 1/00045* (2013.01); *H04N 1/00061* (2013.01); *H04N 1/00079* (2013.01); *H04N 1/23* (2013.01); *H04N 1/3255* (2013.01); *H04N 1/32545* (2013.01); *H04N 1/32555* (2013.01); *H04N 1/6033* (2013.01); *H04N 2201/0094* (2013.01)

(56) References Cited

U.S. PATENT DOCUMENTS

| | | | |
|---|---|---|---|
| 7,489,422 B2 | 2/2009 | Zuber | |
| 7,532,347 B2 | 5/2009 | Barry | |
| 7,639,381 B2 | 12/2009 | Shima | |
| 7,791,751 B2 * | 9/2010 | Lofthus | G06F 3/1215 281/15.1 |
| 7,791,777 B2 | 9/2010 | Barry | |
| 8,014,024 B2 | 9/2011 | Viturro | |
| 8,072,633 B2 | 12/2011 | Fujimori | |
| 8,120,812 B2 | 2/2012 | Sharma | |
| 8,368,951 B2 | 2/2013 | Hayase | |
| 8,584,137 B2 | 11/2013 | Yamauchi | |
| 8,867,081 B2 | 10/2014 | Soriano | |
| 2005/0190389 A1 * | 9/2005 | Tanaka | H04N 1/6033 358/1.9 |
| 2008/0063413 A1 | 3/2008 | Zuber | |
| 2008/0151281 A1 | 6/2008 | Barry | |

\* cited by examiner

Fig. 5 Exterior appearance of Printer

|  | Second criteria | First criteria |
|---|---|---|
| Printer 1 | 600 | 1000 |
| Printer 2 | 1200 | 2000 |
| Printer 3 | 300 | 500 |
| Printer 4 | 480 | 800 |
| Printer 5 | 600 | 1000 |
| Printer 6 | 1800 | 3000 |
| Printer 7 | 300 | 500 |
| Printer 8 | 600 | 1000 |

FIG. 11 print Queue

| Job-ID | Split | Status |
|---|---|---|
| Job3 | No | wait |
| Job2 | No | executing |
| Job1 | No | executing |

Each printer independently conducts calibration based on the first criteria correlated with the printer because no split job is registered in a print queue.

print Queue

| Job-ID | Split | Status |
|---|---|---|
| Job4 | Yes | wait |
| Job3 | No | executing |
| Job2 | No | executing |
| Job1 | No | executing |

Each printer conducts calibration pursuant to an instruction sent from a server because a split job (Job4) is registered in a print queue.

print Queue

| Job-ID | Split | Status |
|---|---|---|
| Job7 | Yes | wait |
| Job6 | No | wait |
| Job5 | No | executing |
| Job4 | Yes | executing |

Each printer conducts calibration pursuant to an instruction sent from a server because a split job (Job4) is registered in a print queue.

print Queue

| Job-ID | Split | Status |
|---|---|---|
| Job10 | No | wait |
| Job9 | No | executing |
| Job8 | No | executing |

Each printer independently conducts calibration based on the first criteria because no split job is registered in a print queue.

FIG. 13

Print Job

| Job Id | Number of pages | Number of copies | Job Properties ||||
|---|---|---|---|---|---|---|
| | | | Job Split | Color | Media | Finishing |
| 1 | 100 | 20 | Yes | color | 11in x 17in<br>8.5in x 11in | fold<br>staple |

Print Job

| Job Id | Number of pages | Number of copies | Job Properties ||||
|---|---|---|---|---|---|---|
| | | | Job Split | Color | Media | Finishing |
| 2 | 50 | 30 | Yes | color | A4 | staple |

FIG. 15A

| Print Device | Device Information | | | | | |
|---|---|---|---|---|---|---|
| Device Id | Status | Color | Media | Finisher | Engine Print Speed (pages/min) | Remaining Paper count |
| Printer1 | Waiting | color | ok | ok | 100 | 850 |
| Printer2 | Waiting | color | ok | ok | 150 | 2000 |
| Printer3 | Waiting | color | ok | ok | 50 | 500 |
| Printer4 | Waiting | color | ok | ok | 80 | 450 |
| Printer5 | Waiting | color | ok | ok | 100 | 440 |
| Printer6 | Waiting | b/w | | | | |
| Printer7 | Executing | | | | | |
| Printer8 | Error | | | | | |

| Print Device | Device Information | | | | | |
|---|---|---|---|---|---|---|
| Device Id | Status | Color | Media | Finisher | Engine Print Speed (pages/min) | Remaining Paper count |
| Printer1 | Waiting | color | ok | ok | 100 | 450 |
| Printer2 | Waiting | color | ok | ok | 150 | 1300 |
| Printer3 | Waiting | color | ok | ok | 50 | 300 |
| Printer4 | Waiting | color | ok | ok | 80 | 150 |
| Printer5 | Waiting | color | ng | | | |
| Printer6 | Waiting | b/w | | | | |
| Printer7 | Waiting | color | ok | ok | 50 | |
| Printer8 | Error | | | | | |

FIG. 15B

| Meet Job Criteria | Assign Job split Id | Job-split distribution | Estimated Print Completion (second) |
|---|---|---|---|
| yes | 1-1 | 40C | 240.00 |
| yes | 1-2 | 70C | 280.00 |
| yes | 1-3 | 20C | 240.00 |
| yes | 1-4 | 30C | 225.00 |
| yes | 1-5 | 40C | 240.00 |
| no | | | |
| no | | Total Print time | 280.00 |
| Meet Job Criteria | Assign Job split Id | Job-split distribution | Estimated Print Completion (second) |
| yes | 2-1 | 40C | 240.00 |
| yes | 2-2 | 60C | 240.00 |
| yes | 2-3 | 20C | 240.00 |
| yes | 2-4 | 15C | 112.50 |
| no | | | |
| no | | | |
| yes | 1-5 | 15C | 180.00 |
| | | Total Print time | 240.00 |

FIG. 15C

|  | Validation 1st criteria | | Validation 2nd criteria | | Calibration 1st criteria | | | Calibration 2nd criteria | | |
|---|---|---|---|---|---|---|---|---|---|---|
|  | Print count | Term | Print count | Term | Print count | Term | ΔE | Print count | Term | ΔE |
| Printer A | 20000 | 3 days | 2000 | 4 hour | 2500 | 4 hour | ±7 | 1000 | 1 hour | ±5 |
| Printer B | 20000 | 2 days | 2000 | 4 hour | 2500 | 4 hour | ±7 | 1000 | 1 hour | ±5 |
| Printer C | 40000 | 4 days | 2000 | 4 hour | 5000 | 8 hour | ±7 | 1000 | 1 hour | ±5 |
| . | . | . | . | . | . | . | . | . | . | . |
| . | . | . | . | . | . | . | . | . | . | . |
| . | . | . | . | . | . | . | . | . | . | . |

FIG. 27

SYSTEM AND METHOD TO ENSURE UNIFORM LEVEL OF COLOR OF A DISTRIBUTED PRINT JOB AMONG MULTIPLE PRINTERS IN A PRINT SHOP

CROSS-REFERENCE TO RELATED PATENT APPLICATIONS

This application is a continuation-in-part of U.S. patent application Ser. No. 14/982,637, filed on Dec. 29, 2015, which is incorporated herein by reference in its entirety.

FIELD OF THE INVENTION

The present disclosure relates to a split job wherein a calibration and validation cycle of target printers is shortened when a split print job is received by a printer server and registered in the print queue of the print server, and wherein destination printers for a split job can be determined among target printers that have an in-line spectrophotometer.

BACKGROUND OF THE INVENTION

In order to optimize a print shop's capacity, a print job can be split among multiple printers. However, color reproduction may not be consistent throughout the targeted printing devices.

Generally, for example, a printing device is calibrated to operate at an ideal level for producing consistent output based on many parameters such as toner life, imaging unit life, temperature, humidity, etc. The problem is each printer may print at different color level due to the printers might have different level of print usage. Some printers may start deviating from the ideal color level due to large volume prints, higher toner consumptions due to high saturation of color required by the print document while some that are lightly utilized the color quality still at good level.

When a printer starts deviating from its ideal color level (or target color level), color correction can be performed either by automatic or manual calibration if the printer requires further action to make the color consistent among each of the plurality of printers. Employing calibration can be predetermined in a printer where parameters condition set its threshold or limits in which color reproduction consistency can no longer guarantee. For example, the threshold or limits can be where a printer reaches certain volume of prints (or copies), an amount of toner consumed, or imaging unit service life.

Although the printer performs its color calibration, it can only guarantee consistent color reproduction within its output and may not be consistent among other printers. Therefore, a system is disclosed that can analyze conditions throughout a plurality of printers to determine the best options, and which can shorten the time calibration cycle of the target printers when a job is split into two or more print jobs.

SUMMARY OF THE INVENTION

In consideration of the above issues, it would be desirable to have a system and method that uses the received print job information to determine the process to take for the target printers to perform calibration before printing a split job to keep color consistency throughout.

A method and system are disclosed in which when a job is split, the criteria of validation and calibration cycle of the target printing device is shortened by receiving the print job and registering the print job in a queue of a print server. In accordance with an exemplary embodiment, the print server can determine if the print job is to be split among two or more printing devices and can identify and/or determine target or destination printing devices to perform the criteria of validation and calibration.

A server is disclosed for ensuring uniform level of color of distributed print jobs among a plurality of printers, wherein each of the plurality of printers is configured to conduct color validation and/or color calibration based on a first criterion, the server comprising: a processor configured to: receive, from a client computer, a request relating to a print job; determine whether the received print job is a split job, which can be split amongst the plurality of the printers; filter at least two printers each having an in-line spectrophotometer from the plurality of printers; and instruct to the each filtered at least two printers so that color validation and/or color calibration is performed based on a second criterion by using the in-line spectrophotometer, wherein the second criterion causes color validation and/or color calibration at each of the each filtered at least two printers to be performed earlier than the first criterion.

A system is disclosed for ensuring uniform level of color of distributed print jobs among a plurality of printers, the system comprising: at least two printers, each of the at least two printers comprising: an in-line spectrophotometer configured to read a color validation chart, the color validation chart having one or more color patches; and a processor configured to: acquire a validation result on a color validation chart from the in-line spectrophotometer, wherein the validation result compares a color accuracy of each of the one or more color patches from the color validation chart to a target color; and a server which is connected to the plurality of printers, the server comprising: a processor configured to: receive a request relating to a print job; determine whether the received print job is a split job, which can be split amongst the plurality of the printers; instruct to the at least two printers so that color validation and/or color calibration is performed based on a second criterion by using the in-line spectrophotometer, wherein the second criterion causes color validation and/or color calibration at each of the each filtered at least two printers to be performed earlier than the first criterion.

A method is disclosed for ensuring uniform level of color of distributed print jobs among a plurality of printers, wherein each of the plurality of printers is configured to conduct color validation and/or color calibration based on a first criterion, the method comprising: receiving, from a client computer, a request relating to a print job; determining whether the received print job is a split job, which can be split amongst the plurality of the printers; filtering at least two printers each having an in-line spectrophotometer from the plurality of printers; and instructing to the each filtered at least two printers so that color validation and/or color calibration is performed based on a second criterion by using the in-line spectrophotometer, wherein the second criterion causes color validation and/or color calibration at each of the each filtered at least two printers to be performed earlier than the first criterion.

A server is disclosed which is configured to be connected to a plurality of printers, each of the plurality of printers configured to conduct color calibration based on a first criterion, the server comprising: a processor configured to: receive a print job; determine whether the received print job is a split job which can be split into at least two printers among the plurality of the printers; and instruct, in response to receiving the split job, to the at least two printers that color calibration is conducted based on a second criterion, wherein the second criterion causes color calibration at each of the at least two printer to be performed earlier than the first criterion.

A system is disclosed for ensuring uniform level of color of distributed print jobs among a plurality of printers in a print shop system, the system comprising: at least two printer, each of the at least two printer comprising: a sensing device configured to read a color validation chart, the color validation chart having one or more color patches; and a processor configured to: acquire a validation result on a color validation chart from the sensing device, wherein the validation result compares a color accuracy of each of the one or more color patches from the color validation chart to a target color; calculate a difference between the color validation chart and the target color; and calibrate the printer based on the difference between the color validation chart and the target color; and a server which is connected to the plurality of printers, and wherein each of the plurality of printers configured to conduct color calibration based on a first criterion, the server comprising: a processor configured to: receive a print job; determine whether the received print job is a split job which can be split into at least two printers among the plurality of the printers; and instruct, in response to receiving the split job, to the at least two printers that color calibration is conducted based on a second criterion, wherein the second criterion causes color calibration at each of the at least two printer to be performed earlier than the first criterion.

A method is disclosed for ensuring uniform level of color of distributed print jobs among a plurality of printers in a print shop system, the method comprising: connecting a server to a plurality of printers, each of the plurality of printers configured to conduct color calibration based on a first criterion; receiving a print job on the server; determining whether the received print job is a split job which can be split into at least two printers among the plurality of the printers; and instructing, in response to receiving the split job, to the at least two printers that color calibration is conducted based on a second criterion, wherein the second criterion causes color calibration at each of the at least two printer to be performed earlier than the first criterion.

A non-transitory computer readable recording medium stored with a computer readable program code is disclosed for ensuring uniform level of color of distributed print jobs among a plurality of printers in a print shop system, wherein a server is configured to be connected to a plurality of printers, each of the plurality of printers configured to conduct color calibration based on a first criterion, the computer readable program code configured to execute a process comprising: receiving a print job on the server; determining whether the received print job is a split job which can be split into at least two printers among the plurality of the printers; and instructing, in response to receiving the split job, to the at least two printers that color calibration is conducted based on a second criterion, wherein the second criterion causes color calibration at each of the at least two printer to be performed earlier than the first criterion.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 11 is a second criteria table in accordance with an exemplary embodiment.

FIG. 13 is a diagram showing print queues of a server in accordance with an exemplary embodiment.

FIGS. 15A-15C is a chart showing print jobs in accordance with an exemplary embodiment.

FIG. 27 is a chart showing a first and a second calibration criterion and a first and a second validation criterion in accordance with an exemplary embodiment.

DETAILED DESCRIPTION

Figure 1:
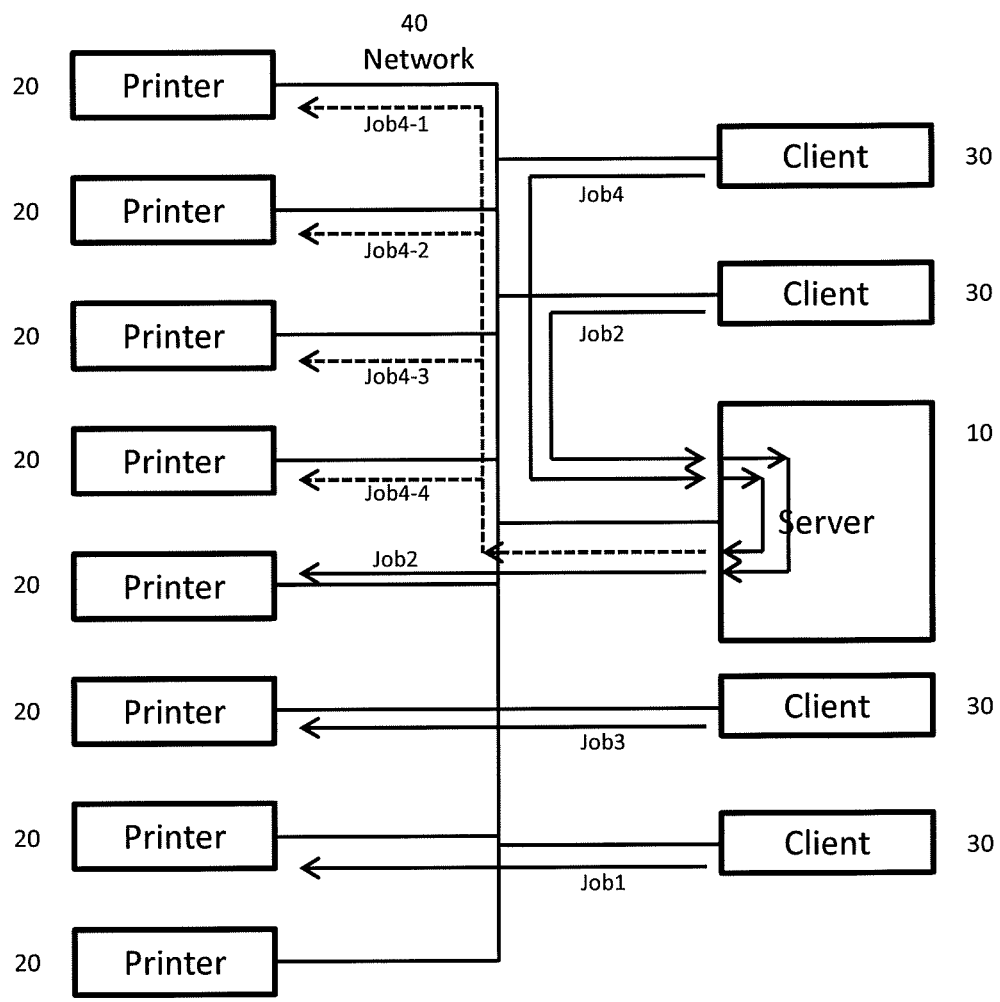
FIG. 1 is a diagram of an exemplary system to help ensure uniform level of color of distributed print job among multiple printers in a print shop system in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, a system and method is disclosed, which can help ensure uniform level of color reproduction of print jobs, which are split among multiple or a plurality of printers, and more particularly, relates to a split job wherein a calibration cycle of target printers is shortened when a split print job is received by a printer server and registered in the print queue of the server.

FIG. 1 is a diagram of a system 1 to help ensure uniform level of color of distributed print job among multiple printers 20 in a print shop system in accordance with an exemplary embodiment. As shown in FIG. 1, the system 1 can include at least one server 10, a plurality of printing devices 20, and one or more client devices 30. In accordance with an exemplary embodiment, the server 10 can be configured to acquire device capabilities and color information from each of the plurality of printing devices 20 and can use the information to invoke color calibration before printing the split job.

In accordance with an exemplary embodiment, a print job can be received by the server 10 from one or more client devices (or client computers) 30. In accordance with an exemplary embodiment, based on print job information, for example, a threshold job property value can be set, which must be met in order for the job to be split (for example, Job4). For example, the threshold job property value can based on a total page count (for example, the number of pages and number of copies) required for completion of the print job. Additional considerations can include, for example, identifying each target printing device, for instance, a color print job requires color printers, and finish accessories associated with each of the one or more printers 20, for example, capabilities, such as stapling, punching, and/or folding. Alternatively, it can be determined that the job is not to be split and can be send either directly to a printer 20 (for example, Job1 and Job3), or determined by the server 10 that the job is to be printed by one of the plurality of printers 20 (for example, Job2).

In accordance with an exemplary embodiment, the server 10 can obtain information to determine the color quality state of each of the one or more of the plurality of printers, which can be used to print the print job and performing a color calibration, for example, such that each printer can guarantee color consistency by itself for a specified number of sheets, for example, for every 1000 printed sheet after the color calibration. However, when a plurality of printers 20 is used for a job split (i.e., wherein a print job is split among two or more printers 20), the color consistency can be guaranteed, for example, for every 600 printed sheets after the color calibration. In accordance with an exemplary embodiment, the present disclosure can help ensure that the calibration cycle of the target printers can be executed immediately once a split job is identified.

Figure 2:
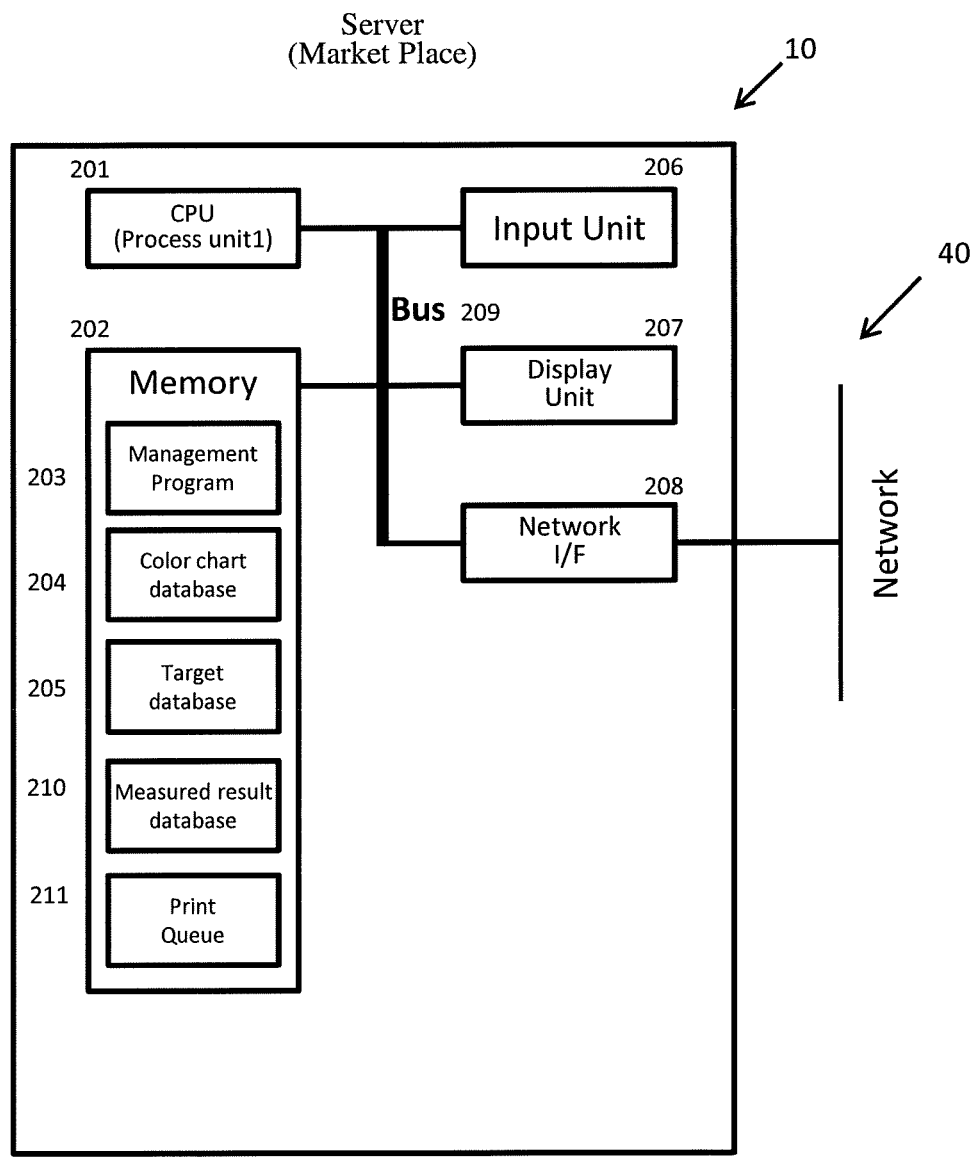
FIG. 2 is a diagram of an exemplary printer server (or server) for use with the system as shown in FIG. 1.

FIG. 2 is a diagram of an exemplary server 10 for use with the system 1 as shown in FIG. 1. As shown in FIG. 2, the server 10 can include a processor or central processing unit (CPU) 201 (or Process Unit 1), and one or more memories 202 for storing software programs and data (such as files to be printed). For example, the software programs can include a print job management program 203, a color chart database 204, a target database 205, a measurement database 210, and a print queue 211. The processor or CPU 201 carries out the instructions of a computer program, which operates and/or controls at least a portion of the functionality of the server 10. The server 10 can also include an input unit 206, a display unit or graphical user interface (GUI) 207, and a network interface (I/F) 208, which is connected to a communication network (or network) 40. A bus 209 can connect the various components 201, 202, 206, 207, and 208 within the server 10. The server 10 can also include an operating system (OS), which manages the computer hardware and provides common services for efficient execution of various software programs.

In accordance with an exemplary embodiment, the network 40 can be a public telecommunication line and/or a network (for example, LAN or WAN) 40. Examples of the communication network 40 can include any telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF) and/or infrared (IR) transmission.

Figure 3:
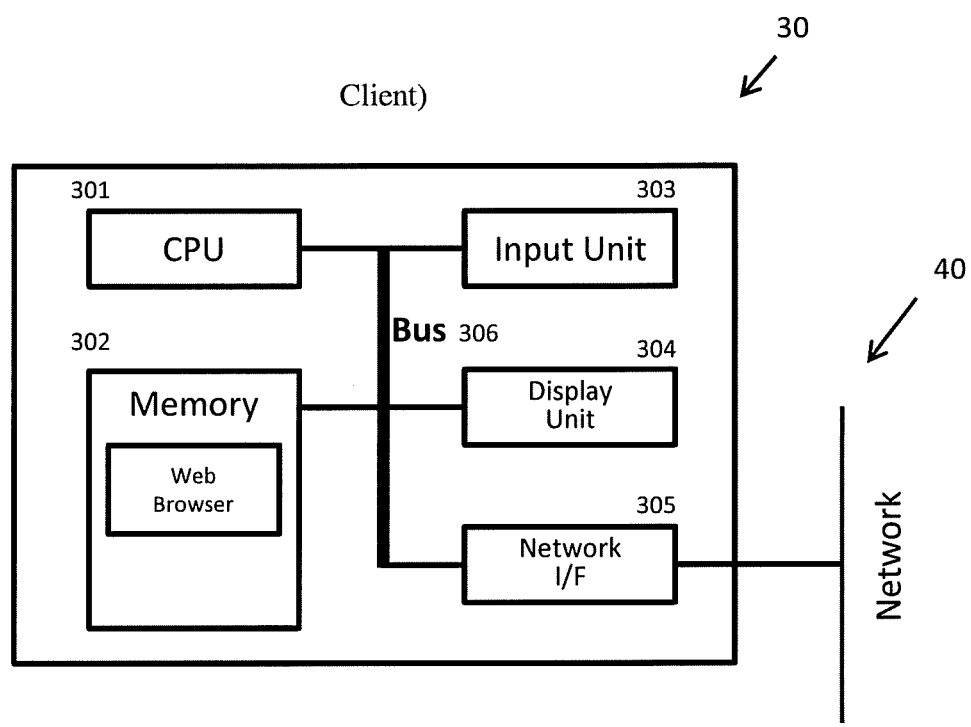
FIG. 3 is a diagram of an exemplary client device for use with the system as shown in FIG. 1.

FIG. 3 is a diagram of an exemplary client device (or client computer) 30 for use with the system 1 as shown in FIG. 1. As shown in FIG. 3, the client device 30 can include a processor or central processing unit (CPU) 301, and one or more memories 302 for storing software programs and data (such as files to be printed). In accordance with an exemplary embodiment, the client device 30 can include a Web browser. The processor or CPU 301 carries out the instructions of a computer program, which operates and/or controls at least a portion of the functionality of the client device 30. The client device 30 can also include an input unit 303, a display unit or graphical user interface (GUI) 304, and a network interface (I/F) 305, which is connected to a communication network (or network) 40. A bus 306 can connect the various components 301, 302, 303, 304, 305 within the client device 30.

The client device 30 includes an operating system (OS), which manages the computer hardware and provides common services for efficient execution of various software programs. The software programs can include, for example, application software and printer driver software. For example, the printer driver software controls a multifunction printer or printer, for example connected with the client device 30 in which the printer driver software is installed via a communication network 40. In certain embodiments, the printer driver software can produce a print job and/or document based on an image and/or document data. In addition, the printer driver software can control transmission of the print job from the client device 30 to the plurality of printers 20.

Figure 4:
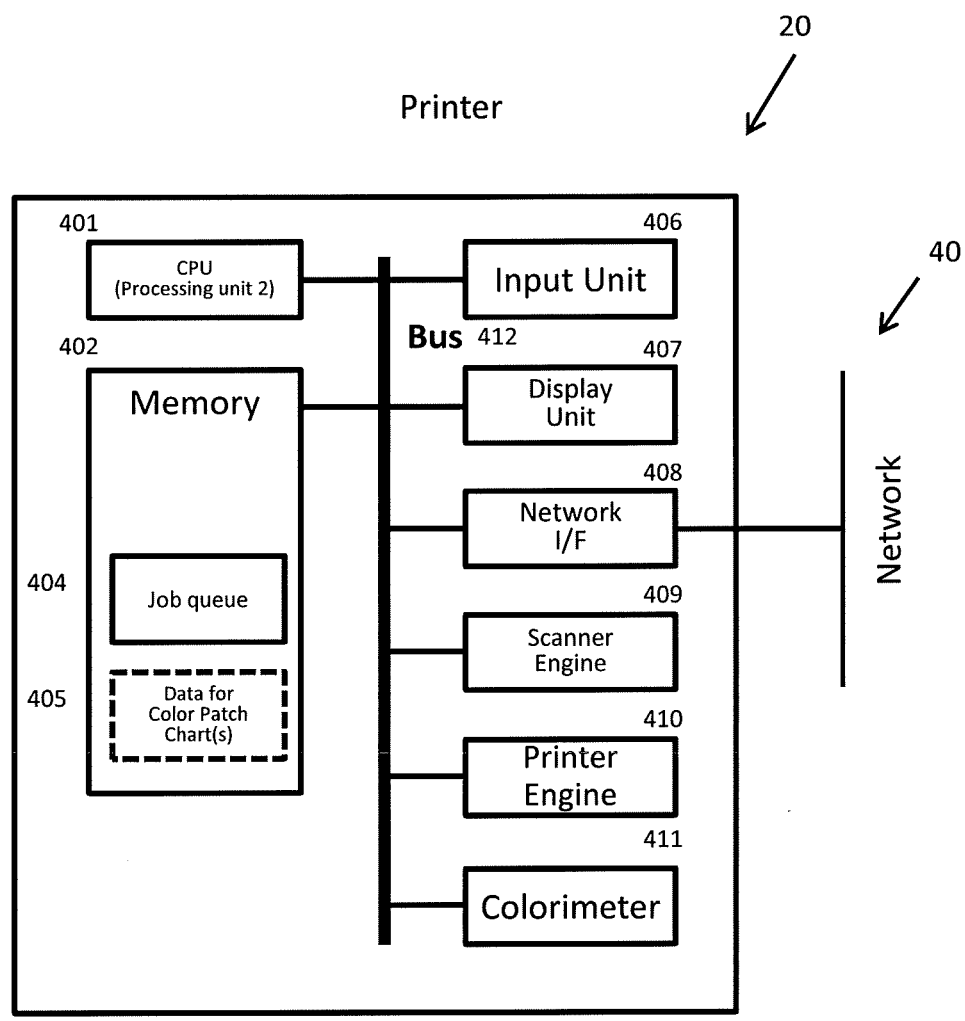
FIG. 4 is a diagram of an exemplary printer or image forming apparatus for use with the system as shown in FIG. 1.

FIG. 4 is a diagram of an exemplary printer or image forming apparatus 20 for use with the system 1 as shown in FIG. 1. As shown in FIG. 4, the printer 20 can include a processor or central processing unit (CPU) 401, and one or more memories 402 for storing software programs and data (such as files to be printed). For example, the software programs can include a job queue 404 and data for color patch chart(s) 405. The processor or CPU carries out the instructions of a computer program, which operates and/or controls at least a portion of the functionality of the printer 20. The printer 20 can also include an input unit 406, a display unit or graphical user interface (GUI) 407, and a network interface (I/F) 408, which is connected to a communication network (or network) 40, a scanner engine 409, a printer engine 410, and a colorimeter 411. In accordance with an exemplary embodiment, for example, the colorimeter 411 can be one or more color sensors or colorimeters, such as an RGB scanner, a spectral scanner with a photo detector or other such sensing device known in the art, which can be embedded in the printed paper path, and an optional finishing apparatus or device (not shown). A bus 412 can connect the various components 401, 402, 406, 407, 408, 409, 410, 411 within the printer 20. The printer 20 also includes an operating system (OS), which manages the computer hardware and provides common services for efficient execution of various software programs In accordance with an exemplary embodiment, it can be within the scope of the disclosure for the printer 20 to be a copier. The printer or print engine 410 has access to a print media (not shown) of various sizes and workflow for a print job, which can be, for example, stored in the input tray. A "print job" or "document" can be a set of related sheets, usually one or more collated copy sets copied from a set of original print job sheets or electronic document page images, from a particular user, or otherwise related.

For example, in accordance with an exemplary embodiment, an image processing section within the printer 20 can carry out various image processing under the control of a print controller or CPU 401, and sends the processed print image data to the print engine 410. The image processing section can also include a scanner section for optically reading a document, such as an image recognition system. The scanner section receives the image from the scanner and converts the image into a digital image. The print engine 410 forms an image on a recording sheet based on the image data sent from the image processing section. The central processing unit (CPU) (or processor) 401 and the memory 402 can include a program for RIP processing (Raster Image Processing), which is a process for converting print data included in a print job into Raster Image data to be used in the printer or print engine 410. The CPU 401 can include a printer controller configured to process the data and job information received from the one or more client devices (not shown), for example, received via the network connection unit and/or input/output section (I/O section) 408.

The CPU 401 can also include an operating system (OS), which acts as an intermediary between the software programs and hardware components within the multi-function peripheral. The operating system (OS) manages the computer hardware and provides common services for efficient execution of various software applications. In accordance with an exemplary embodiment, the printer controller can process the data and job information received from the one or more client devices (not shown) to generate a print image.

The network I/F 408 performs data transfer with the server 10 or client device 30. The printer controller can be programmed to process data and control various other components of the multi-function peripheral to carry out the various methods described herein. In accordance with an exemplary embodiment, the operation of printer section commences when it receives a page description from the one or more client devices (not shown) via the network I/F 408 in the form of a print job data stream and/or fax data stream. The page description may be any kind of page description languages (PDLs), such as PostScript® (PS), Printer Control Language (PCL), Portable Document Format (PDF), and/or XML Paper Specification (XPS). Examples of printers 20 consistent with exemplary embodiments of the disclosure include, but are not limited to, a multi-function peripheral (MFP), a laser beam printer (LBP), an LED printer, a multi-function laser beam printer including copy function.

In accordance with an exemplary embodiment, the color calibration of each of the plurality printers 20 as shown in FIG. 1 can be performed by creating a color test pattern, for example, on the print controller of the CPU 401, which can be, for example, a Digital Front End (DFE) printer controller that can be set based on one or more print conditions, for example, after a specific number of print copies have been printed by the image forming apparatus or printer 20. With the calibration setting enabled, the color measurement pages can be printed, and the one or more printed color patches to a corresponding target color for each of the one or more printed color patches. The color calibration patch compared to the target color (or target color data) can determine the color rendering performance of print engine of the image forming apparatus or printer 20.

In accordance with an exemplary embodiment, the printer 20 can have a color calibration setting, which checks the printed colors of the one or more color chart(s) (or measurement page(s)), each of the one or more color chart(s) (or measurement page(s)) having a plurality of color patches with a target color for each of the one or more color patches. The color calibration setting can be enabled on the image forming apparatus, for example, when a predetermined number of sheets or pages have been printed by the printer or image forming apparatus 20. In addition, the color calibration setting can be enabled after a preset time or period, for example, after servicing of the printer 20.

Figure 5:
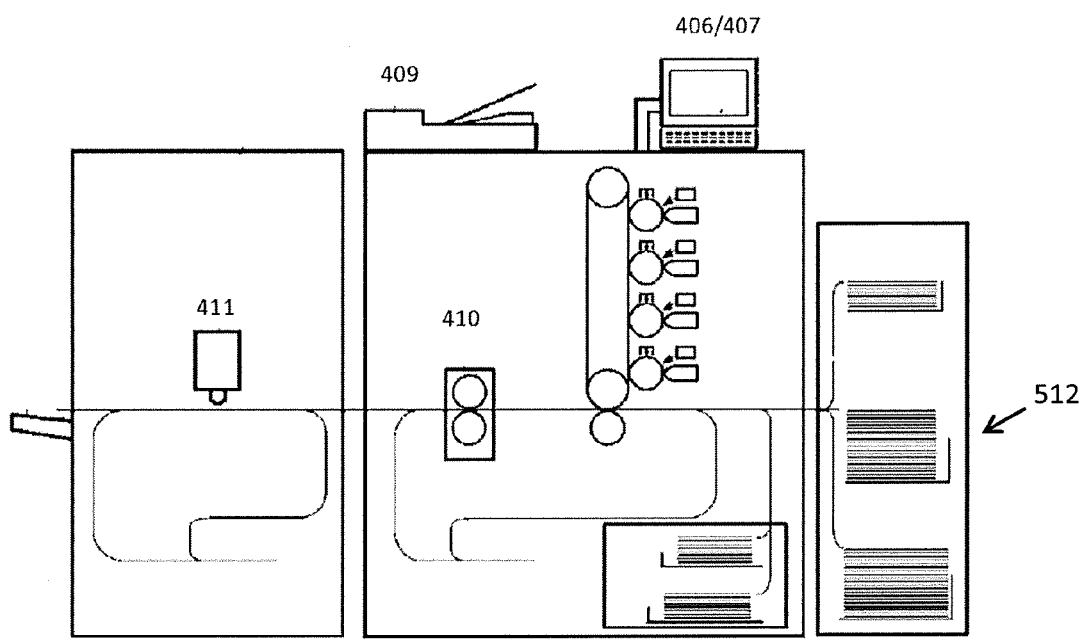
FIG. 5 is an illustration of a printer or image forming apparatus in accordance with an exemplary embodiment.

FIG. 5 is an illustration of a printer 20 in accordance with an exemplary embodiment. As shown in FIG. 5, the printer 20 includes the input unit 406, the display unit or graphical user interface (GUI) 407, the scanner engine 409, the printer engine 410, and the colorimeter 411. In accordance with an exemplary embodiment, for example, the colorimeter 411 can be one or more color sensors or colorimeters, such as an RGB scanner, a spectral scanner with a photo detector or other such sensing device known in the art, which can be embedded in the printed paper path.

Figure 6:
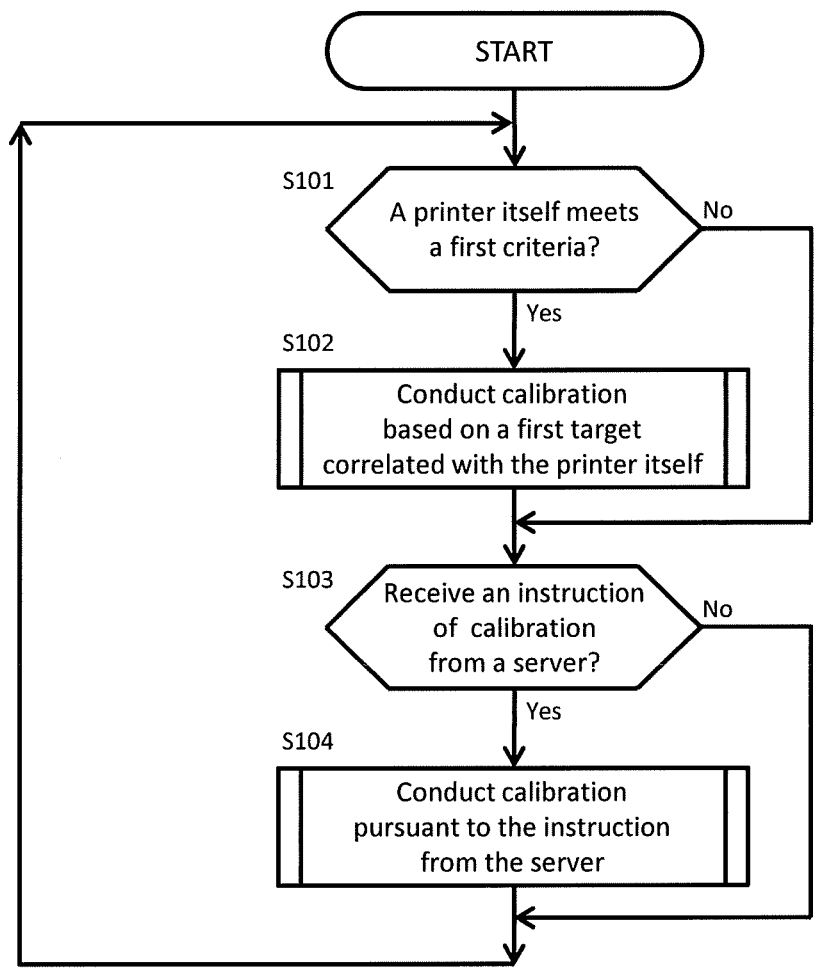
FIG. 6 is flow chart illustrating a process for each of the plurality of printers in accordance with an exemplary embodiment.

FIG. 6 is flow chart illustrating a process for each of the plurality of printers 20 in accordance with an exemplary embodiment. As shown in FIG. 6, the process starts in step S101, where a determination is made if the printer 20 meets a first criteria. In accordance with an exemplary embodiment, for example, the first criteria can be that a printer can guarantee color consistency for a specified number of sheets, for example, for every 1000 printed sheet after color calibration. If the printer 20 does not meet the first criteria, the process continues to step S103, where a determination is made, if an instruction from the server 10 has been received to calibrate the printer 20. Alternatively, if the printer does meet the first criteria, the process continues to step S102, where a color calibration is conducted on the printer 20 based on a first target (or first target color) correlated with the printer itself. In step S103, if the printer 20 does not receive an instruction from the server 10 to perform a color calibration, the process returns to step S101. Alternatively, if the printer 20 receives an instruction from the server 10 to perform a color calibration, in step S104, a color calibration is conducted pursuant to the instructions received from the server 10.

Figure 7:
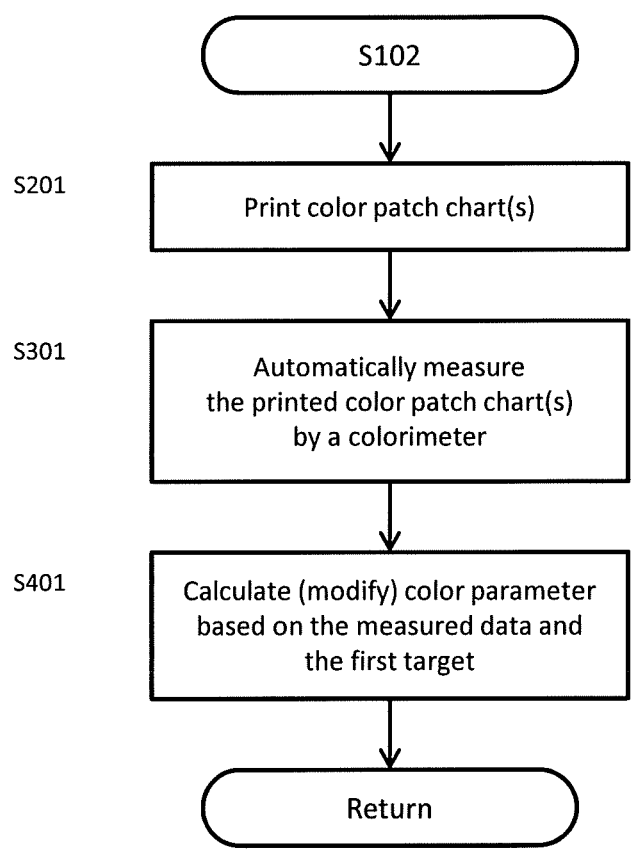
FIG. 7 is a flow chart illustrating a process of conducting calibration based on a first target correlated with the printer in accordance with an exemplary embodiment.

FIG. 7 is a flow chart illustrating a process of conducting color calibration 102 based on a first target correlated with the printer 20 in accordance with an exemplary embodiment. As shown in FIG. 7, the color calibration process S102 starts in step S210, where the color patch chart(s) (or measurement sheets) having a plurality of color patches (or calibration print stripes) is printed. In step S301, the color patch chart(s) are preferably read by an inline measuring device or colorimeter 411. The inline measuring device or colorimeter 411, for example, can be one or more inline color sensors (not shown), which are located in the paper path, and which feeds information to the CPU 401 for processing. The information received by the CPU (or processor) 401 from the measuring device or colorimeter 411 can be used to calculate or modified the color parameters of the printer 20. In step S401, the color parameters of the printer 20 can be calculated or modified based on the measured data and the first target.

Figure 8:
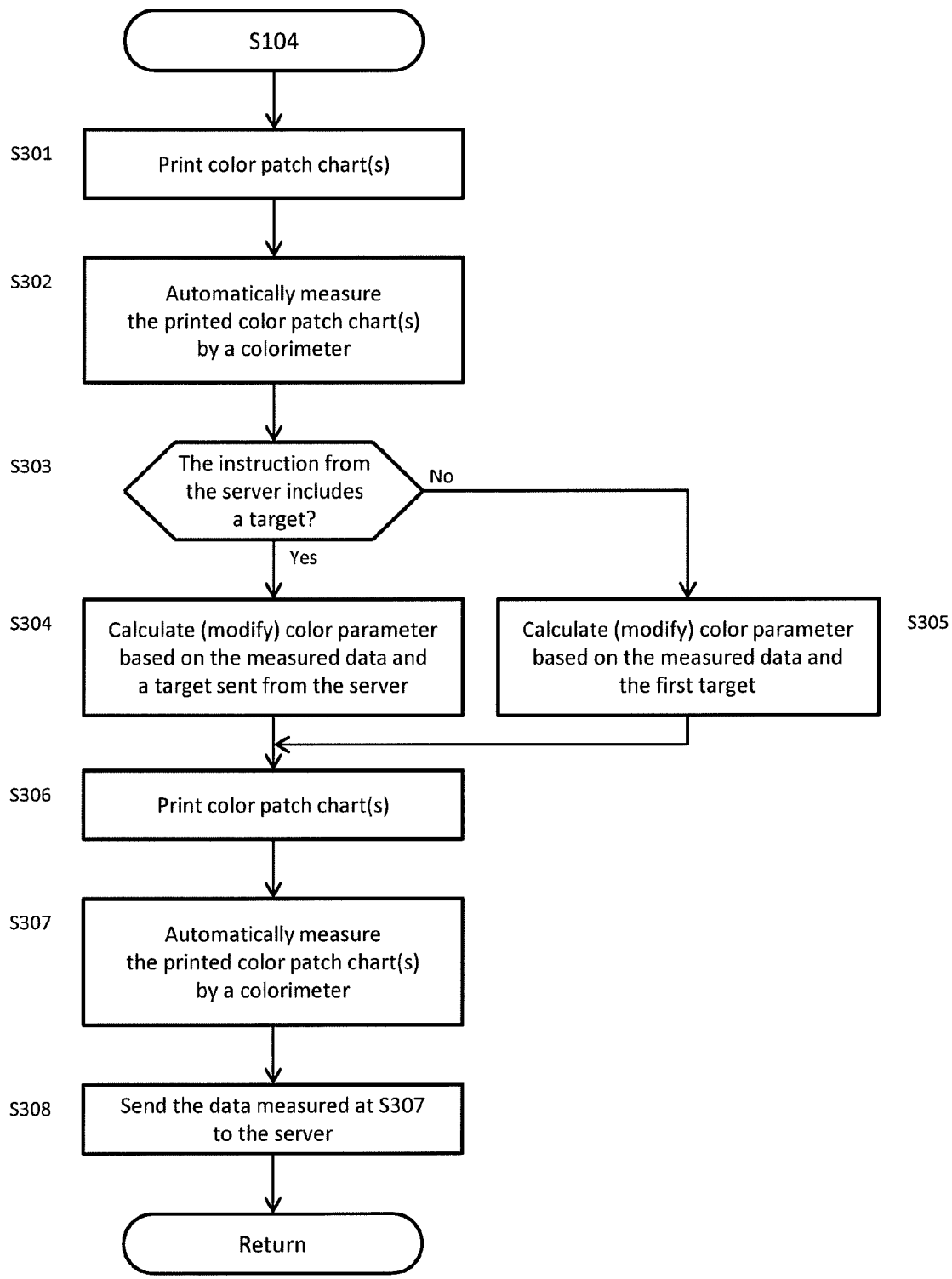
FIG. 8 is a flow chart illustrating a process of conducting calibration pursuant to an instruction received from the server.

FIG. 8 is a flow chart illustrating a process of conducting calibration S104 pursuant to an instruction received from the server 10. As shown in FIG. 8, in step S301, the color patch chart(s) (or measurement sheets) are printed. In step S302, the printed color patch chart(s) are automatically measured by the colorimeter 411. In step S303, a determination is made if the instructions from the server 10 include a target. If the instructions do not include a target (i.e., "no"), the process continues to step S305, where the color parameters of the printer 20 are calculated and/or modified based on the measured data and the first target. If the instructions do include a target, in step S304, the color parameters of the printer are calculated and/or modified based on the measured data and a target sent from the server 10. The process continues to step S306, where the color patch chart(s) are printed. In step S307, the printed color patch chart(s) are automatically measured by the colorimeter. In step S308, the data measured on the printed color patch(s) in step S307 is sent to the server 10.

Figure 9:
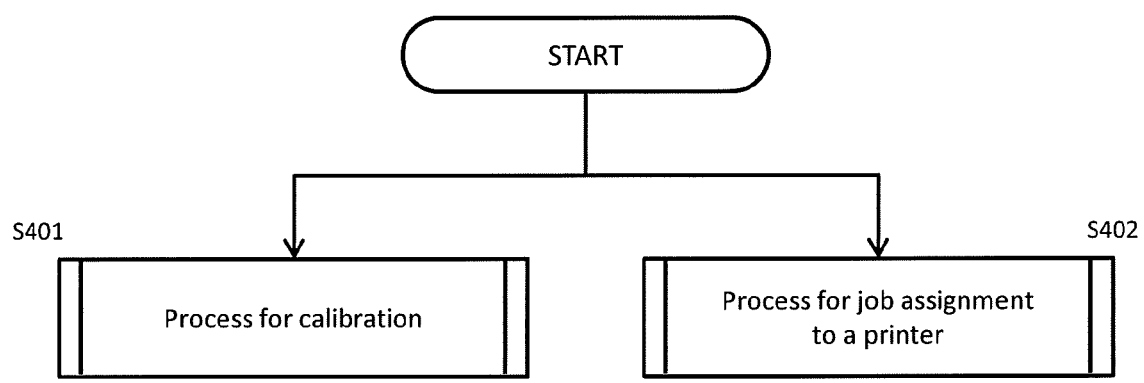
FIG. 9 is a flow chart illustrating a process performed by the server for calibration and job assignment to a printer in accordance with an exemplary embodiment.

FIG. 9 is a flow chart illustrating a process performed by the server 10 for calibration and job assignment to at least one printer 20 in accordance with an exemplary embodiment. As shown in FIG. 9, the process starts and proceeds to step S401 for calibration of a printer 20 or step S402 for a job assignment to a printer 20.

Figure 10:
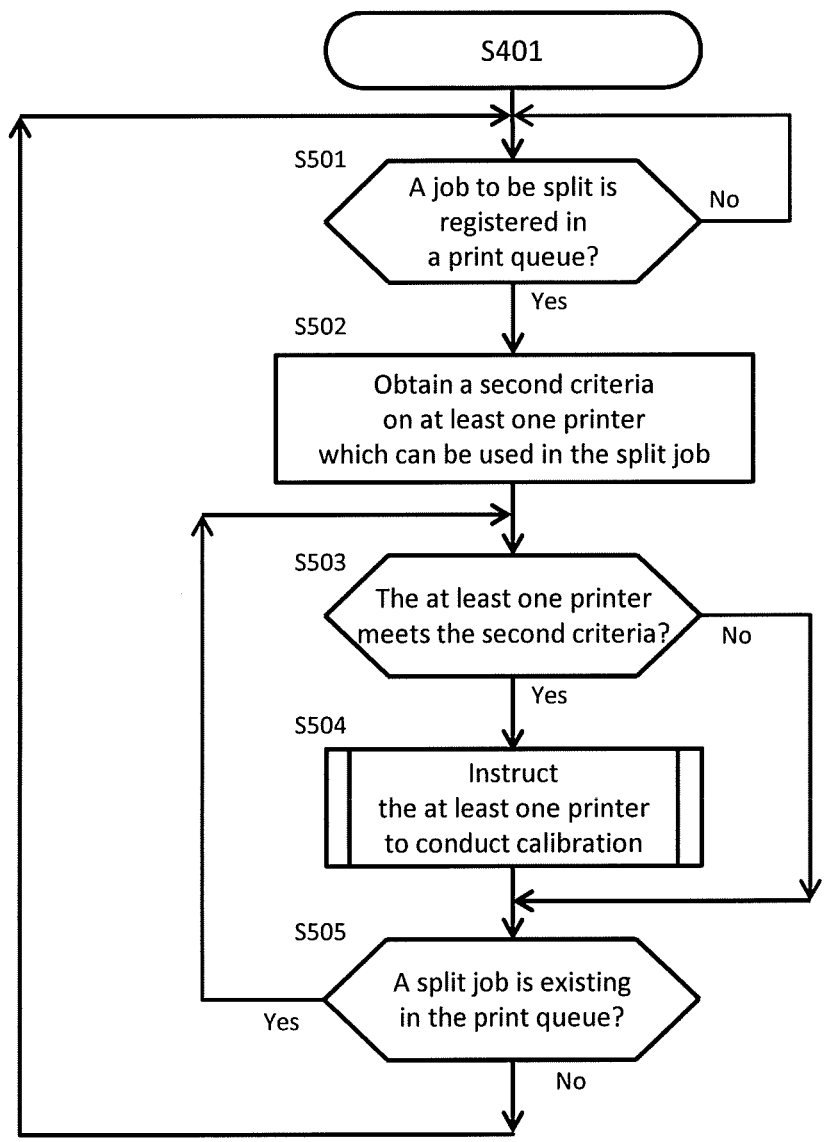
FIG. 10 is a flow chart illustrating a process for calibration of a printer in accordance with an exemplary embodiment.

FIG. 10 is a flow chart illustrating a process for calibration of a printer (step S401) in accordance with an exemplary embodiment. As shown in FIG. 10, in step S501, a determination is made if the job registered in the print queue of the server 10 is a job that could be split. If the job could not be split, the process returns to the start. If the job could be split, in step S502, a second criteria on at least one printer 20, which can be used for the split job is obtained. In step S503, a determination is made if the at least one printer 20 meets the second criteria. For example, in accordance with an exemplary embodiment, the second criteria is a print count or a time period after conducting a prior color calibration. If the at least one printer 20 does not meet the second criteria, the process continues to step S505, where a determination is made if a split job is still existing in the print queue of the server 10. If the at least one printer 20 meets the second criteria in step S503, the process proceed to step S504, where the at least one printer 20 is instructed to conduct a color calibration. The process then proceeds to step S505 where a determination is made if there is a split job existing in the print queue of the server 10, the process continues to step S503. If there is no split job existing in the print queue of the server, the process continues to step S501.

FIG. 11 is a second criteria table in accordance with an exemplary embodiment. As shown in FIG. 11, the second criteria table, can include a plurality of printers 20 (Printer 1, Printer 2 . . . Printer 8), a listing of the second criteria and a listing of the first criteria for each of the plurality of printers 20. As shown in FIG. 11, the first and second criteria are in pages printed by each of the plurality of printers 20.

Figure 12:
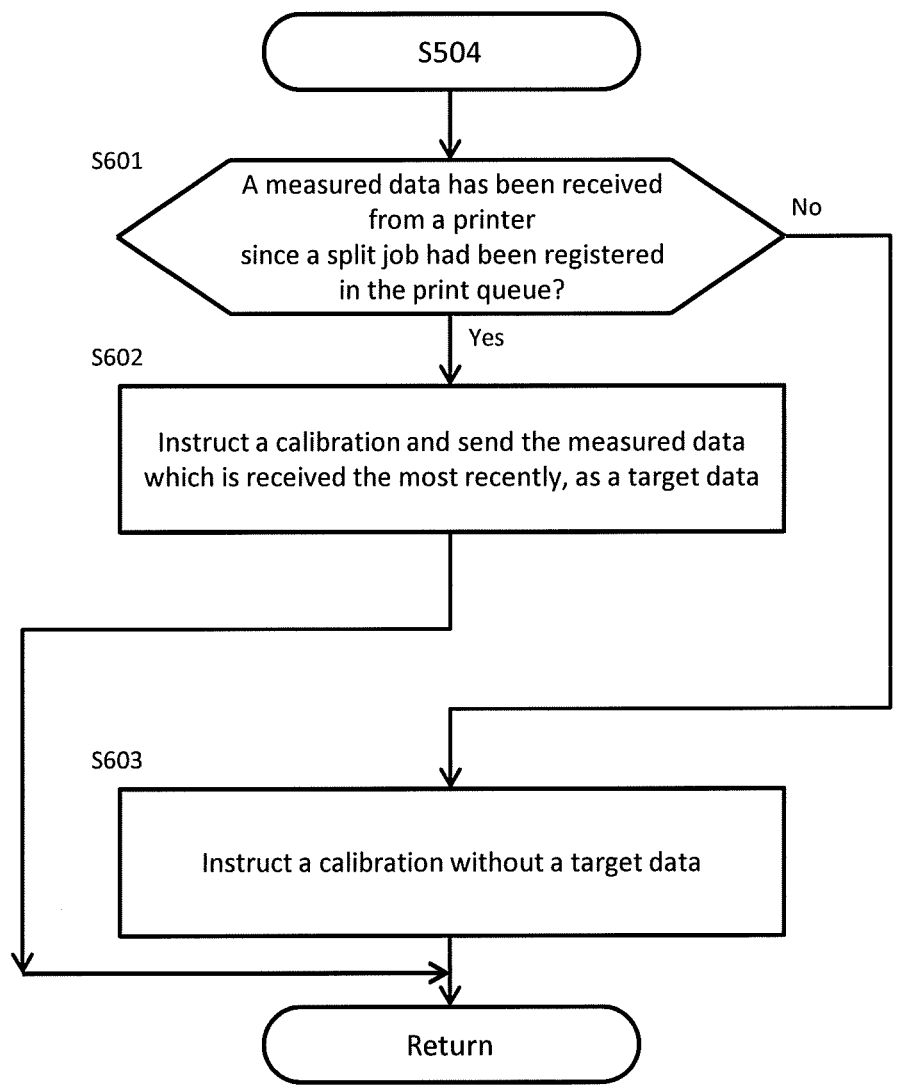
FIG. 12 is a flow chart illustrating a process of instructing at least one printer to conduct calibration.

FIG. 12 is a flow chart illustrating a process of instructing at least one printer to conduct calibration (step S504) in accordance with an exemplary embodiment. As shown in FIG. 12, in step S601, a determination is made, if measured data has been received from a printer 20 since a split job has been registered in the print queue of the server 10. If the answer to step S601 is "no", the process continues to step S603, where the printer 20 is instructed to conduct a calibration without a target data. If the answer to step S601 is "yes", in step S602, the calibration instruction is received, and the measured data, which is received most recently, is sent as the target data.

FIG. 13 is a diagram showing print queues of a server 10 in accordance with an exemplary embodiment. As shown in FIG. 13, in the first example, each printer can independently conduct calibration based on the first criteria correlated with the printer because no split job is registered in a print queue. In the second example, each printer can conduct calibration pursuant to an instruction sent from the server 10 because a split job (Job4) is registered in a print queue. In the third example, each printer conducts calibration pursuant to an instruction received from the server 10 because a split job (Job4) is registered in a print queue. In accordance with an exemplary embodiment, for example, each of the at least two printers can be instructed that color calibration is to be conducted based on the second criterion while the split job is being registered in the print queue or while the split job is being executed by the at least two printers. In the fourth example, each printer can independently conduct calibration based on the first criteria because no split job is registered in a print queue.

Figure 14:
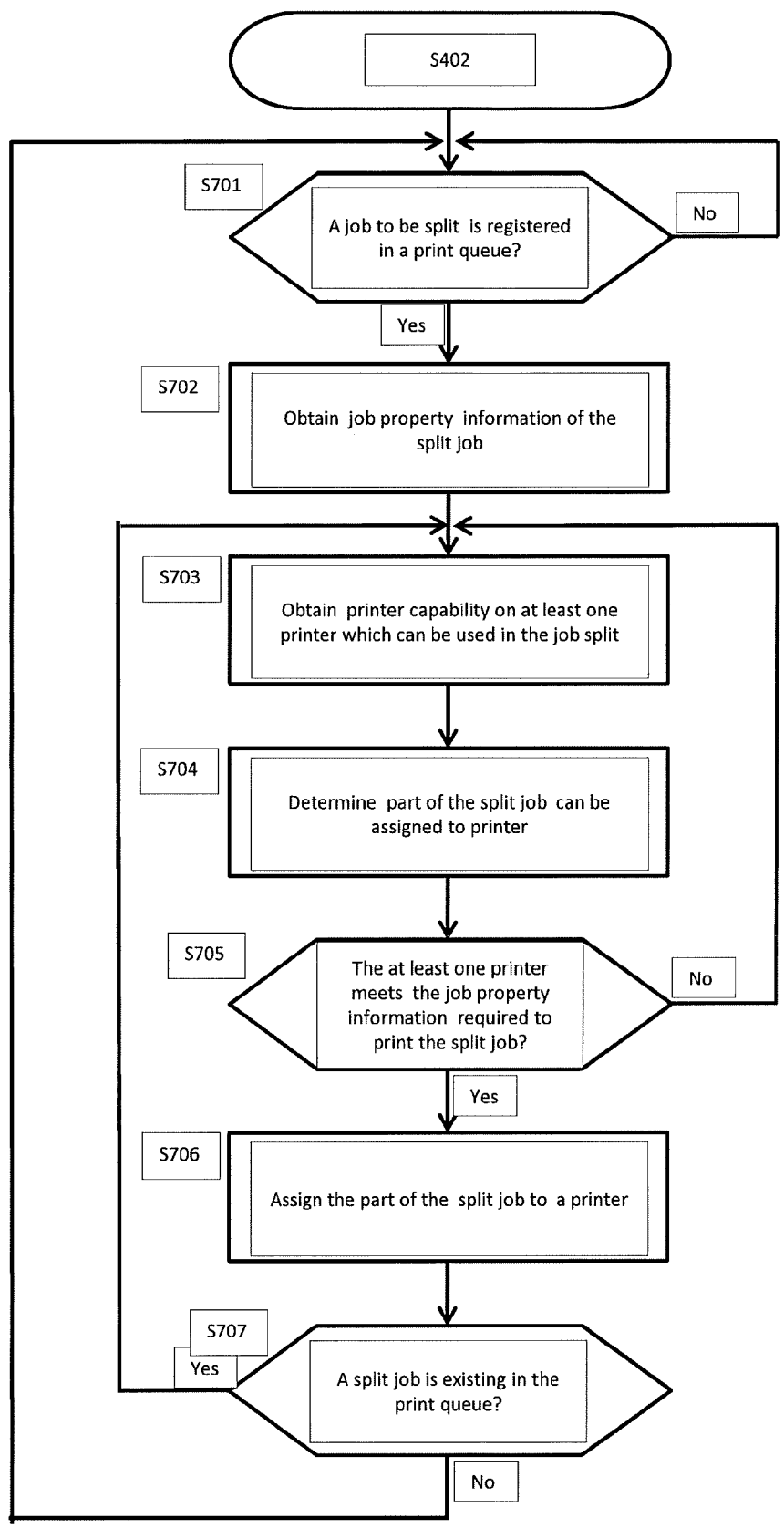
FIG. 14 is a flow chart illustrating a process for job assignment for a split job to a printer in accordance with an exemplary embodiment.

FIG. 14 is a flow chart illustrating a process for job assignment for a split job to a printer (step S402) in accordance with an exemplary embodiment. As shown in FIG. 14, in step S701, a determination is made if a job to be split is registered in a print queue. If the answer is "no", the process returns to start over. However, if the answer in step S701 is "yes", the process continues to step S702, where the job property information of the split job is obtained. In step S703, printer capability on at least one printer which can be used in the job split is obtained. In step S704, a determination is made if part (or a portion) of the split job can be assigned to the printer. In step S705, a determination is made if the at least one printer meets the job property information required to print the split job. If the answer is "no" in step S705, the process returns to step S703. If the answer is "yes" in step S705, the process continues to step S706, where part or a portion of the split job can be assigned to the printer 20. In step S707, a determination can be made if a split job exists in the print queue. If the answer in step S707 is "no", the process returns to step S701. Alternatively, if the answer is "yes", the process returns to step S703.

FIGS. 15A-15C is a chart showing print jobs in accordance with an exemplary embodiment. As shown in FIGS. 15A-15C, for each print job, the corresponding data can include a job id (or job identifier), number of pages, number of copies, whether the job is split job or not, color or black and white (B/W), media, finishing, printer devices (for example, Printer 1, . . . , Printer 8), device information for each of the printers, which can include status, color or black and white (B/W), media, finisher, engine print speed, remaining paper count, does the printer meet the job criteria, assign job split id (identifier), job split distribution, and estimated print completion time.

In accordance with an exemplary embodiment, a system and method are disclosed, which can determine which printing devices or printers 20 can meet a print quality standard, for example, for a color print job by allowing a CPU, for example, the Processing Unit 1 201 of the server 10 to make the determination in an automated fashion with little or no human intervention. In addition, in an exemplary embodiment such determination can be done across a range or number of printing devices 20 that are connected in a market place 12 and/ or a print shop 14 via a communication network 40.

In accordance with an exemplary embodiment, in order to optimize a print shop's capacity and meet the customer's print job requirements, a print job can be split among multiple target printing devices (or printers) 20. However, color reproduction of the job splits may not be consistent throughout the targeted printing devices. Each of the printing devices 20 can be calibrated to operate at an ideal level for producing consistent output based on many parameters such as toner life, imaging unit life, temperature, humidity, etc. However, the problem can be that each printer 20 may print at different color level due to the printers 20 own color quality optimization. Some printers 20 may start deviating from the ideal color level due to large volume prints, higher toner consumptions due to high saturation of color required by the print document while some that are lightly utilized the color quality still at good level. When a printer 20 starts deviating from its ideal color level, color correction can be performed either by automatic or manual calibration if it requires further action to make the color consistent among others.

Employing calibration can be predetermined in a printer 20 were parameters condition set its threshold or limits in which color reproduction consistency can no longer guarantee. For example, when a printer 20 reaches certain volume of prints, amount of toner consumed or imaging unit service life. Although the printer performs its color calibration, it can only guarantee consistent color reproduction within its output and may not be consistent among other printers. Therefore, it would be desirable to have a system wherein when a job is split, for example, the job is split amongst at least two printers, the criteria for the validation and calibration cycle of the target printing device 20 is shortened.

Advantageously, the method and system as disclosed herein for determining printing devices for a print job amongst a group or plurality of printing devices using an in-line spectrophotometer can determine the validation and calibration cycle when a print job is split, can determine which printing devices meet a predetermined print quality, for example, a color quality standard for the job, the CPU or Processing Unit 1 of the server 10 can make the determination or selection of destination printers in an automated fashion with little or no human intervention, and such determinations can be done across a range of printing devices that are connected in the network.

Figure 16:
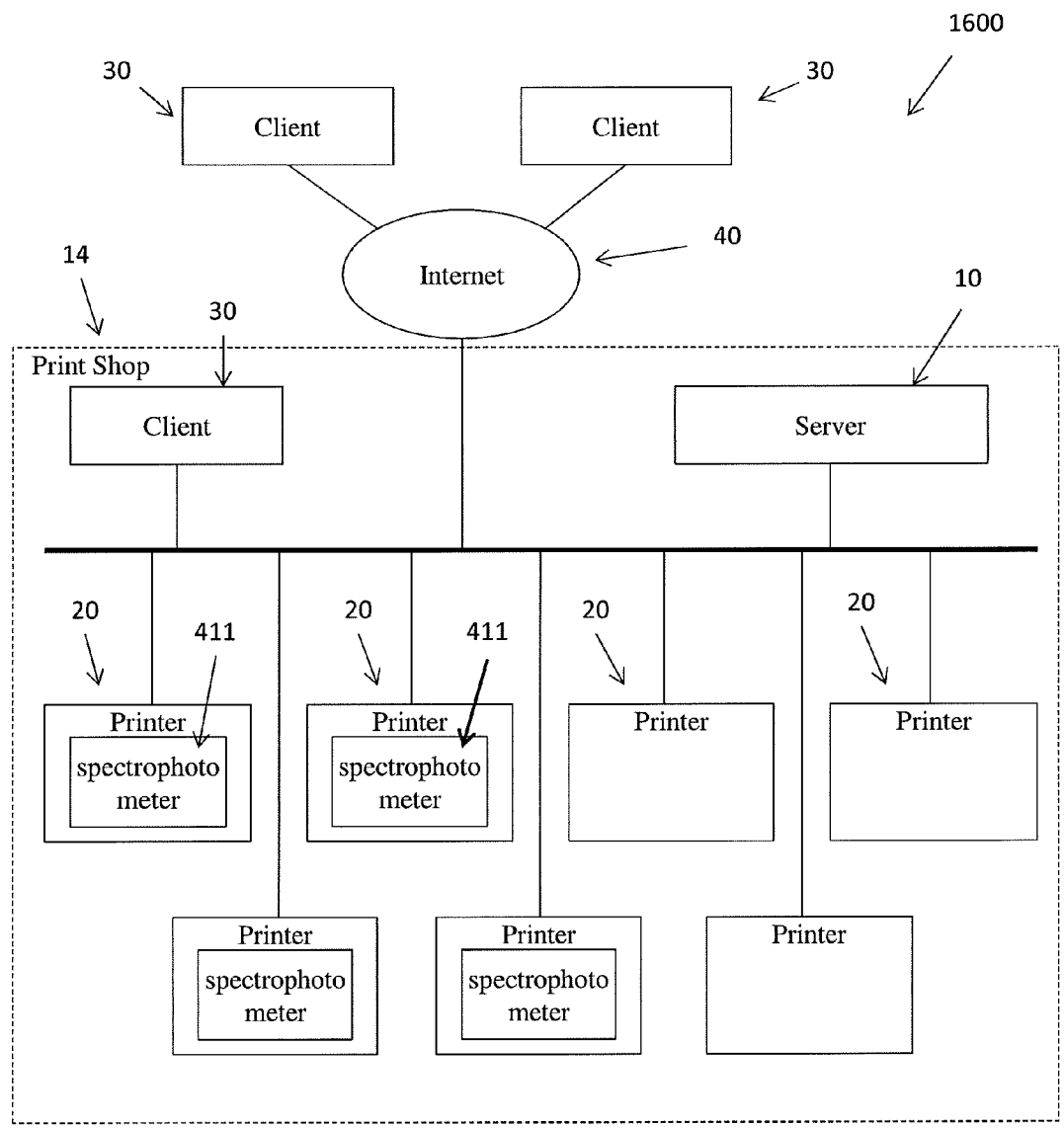
FIG. 16 is an illustration of an exemplary system for determining printing devices or a printer for a print job amongst a group or plurality of printing devices using an in-line spectrophotometer in a marketplace setting in accordance with an exemplary embodiment.

FIG. 16 is an illustration of an exemplary system 1600 for determining printing devices or printers 20 amongst a group or plurality of printing devices 20 using an in-line spectrophotometer in a print shop 14 in accordance with an exemplary embodiment. As shown in FIG. 16, the system 1600 can include at least one server (or print server) 10, a plurality of printers or printing devices 20, and one or more client devices or client computers 30, which are connected, for example by a communication network (or network) 40. In accordance with an exemplary embodiment, at least one of the one more printers or printing devices 20 has a spectrophotometer (or colorimeter) 411 (FIG. 4).

Figure 17:
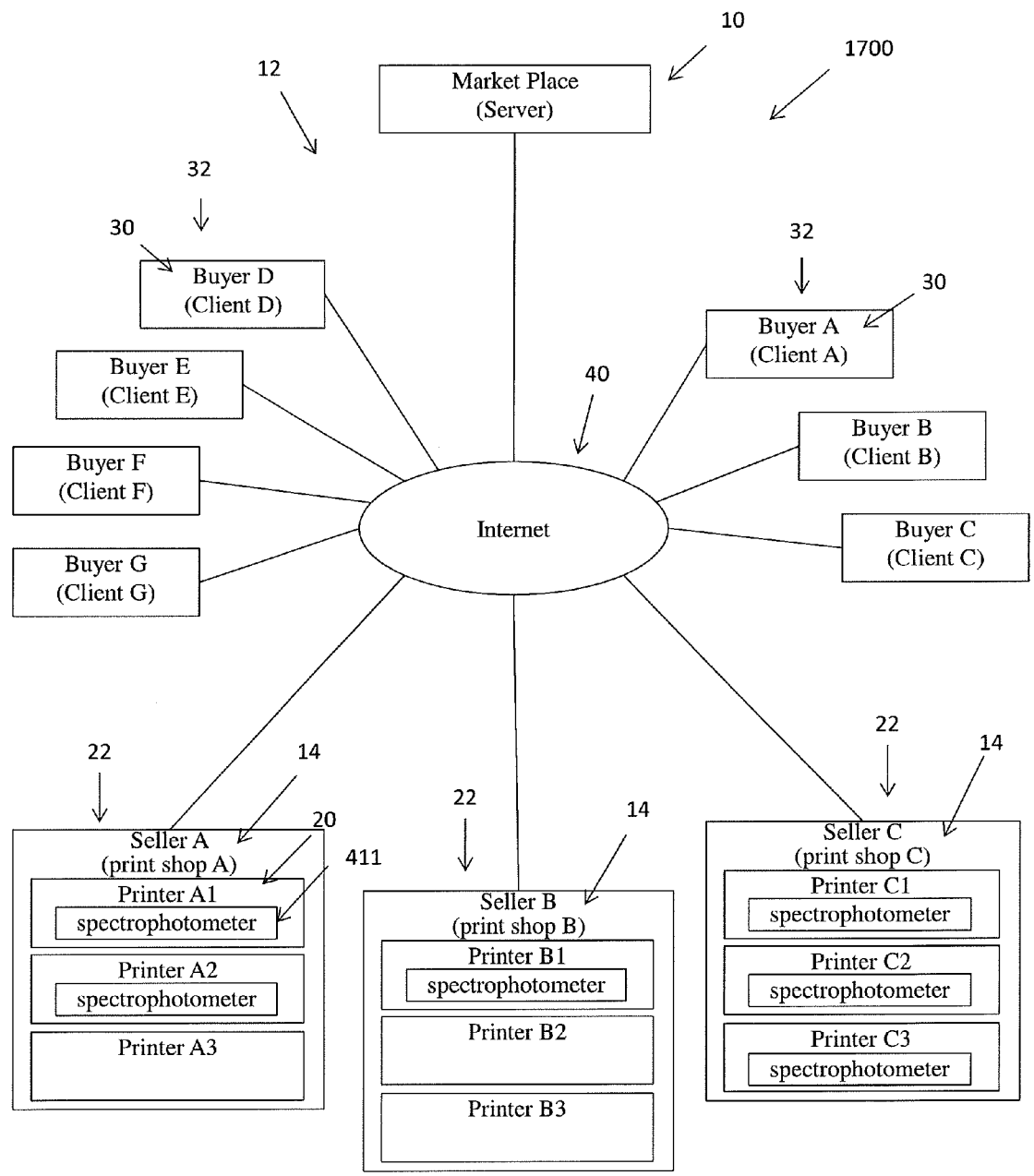
FIG. 17 is an illustration of an exemplary system for determining printing devices or printers for a print job amongst a group or plurality of printing devices using an in-line spectrophotometer in a print shop in accordance with an exemplary embodiment.

FIG. 17 is an illustration of an exemplary system 1700 for determining printing devices or printers for a print job amongst a group or plurality of printing devices 20 using an in-line spectrophotometer in a marketplace setting 12 in accordance with an exemplary embodiment. As shown in FIG. 17, the system 10 can include at least one server 10 for the marketplace 12, one or more buyers or customers 32, each of the one or more buyers or customers having a client device or client computer 30, and a plurality of printers or printing devices 20, which are connected, for example by a communication network (or network) 40. In accordance with an exemplary embodiment, for example, the plurality of printers or printing devices 20 can be located within one or more print shops 14. Each of the one or more print shops 14 can house one or more printers or printing devices 20. In accordance with an exemplary embodiment, at least one of the one or more printers or printing devices 20 in each of the one or more print shops 14 has a spectrophotometer (or colorimeter) 411 (FIG. 4).

In accordance with an exemplary embodiment, the one or more client computers 30 each include a display unit or graphical user interface (GUI), which can include a web browser 306, which provides access to a management program 203 on the server and designed to specifically bring together a customer (also referred to as the buyer) looking to have a print shop (also referred to as the seller) to print a specific job, whether it's a book, a stapled document, instruction manuals, flyers, labels, etc. In accordance with an exemplary embodiment, the management program 203 can include a database of printers or printing devices 20. In addition, the management program 203 can include a web portal, which is hosted on the at least one server 10. However, the web portal 202 can be hosted on one or more client computers 30 and/or on one or more printers 20, for example, within a print shop 14. The web portal is configured to receive information from one or more buyers 32 and sellers 22 or print shops 14 to execute print jobs as disclosed herein.

For example, in accordance with an exemplary embodiment, the system and method as disclosed herein is configured to bring together a buyer 32 looking for a product or service to purchase with a group of sellers selling such product or service. For example, the web portal can be specifically configured to sell printing service to potential customers. For example, in accordance with an exemplary embodiment, the selling of printing services can done through a bidding system where a buyer posts its printing requirements, and the software system (also referred to as the "Processing Unit 1") 201 as hosted, for example, on the server 10 (FIG. 2), can filter and choose the best 2 to 3 sellers 22 who are capable to delivering such printing services.

In accordance with an exemplary embodiment, after the potential sellers list has been narrowed down to two (2) to three (3) sellers, the Processing Unit 1 201 can commence a bidding system to give sellers the chance to set a price to do the print job. Once bidding has ended, the CPU (Processing Unit 1) 201 will present the results to the buyer 32 who will then choose the most appropriate seller 22 who can meet the customer's print job requirements. Thus, in accordance with an exemplary embodiment, the system and method as disclosed, can determine, for example, how to best filter the list of sellers down to 2 to 3 sellers to start the bidding.

For example, if the buyer is requesting that the print job have a very high print quality, the CPU (Processing Unit 1) 201 on the server 10 can be configured to determine which sellers 22 and corresponding printers (or destination printers) 20 are able to provide a desired print quality. In accordance with an exemplary embodiment, for example, the desired print quality can be determined through the use an in-line spectrophotometer on one or more printers 20 within each of the one or more print shops 22 wishing to bid on the job. For example, in accordance with an exemplary embodiment, the high print quality can be a color quality exceeding a predetermined print quality target as calculated in a validation process or calibration process on one or more of the printing devices 20.

In accordance with an exemplary embodiment, in-line spectrophotometer 411 is a spectrophotometer that is included as part of the printing device 20. In accordance with an exemplary embodiment, the spectrophotometer 411 is preferably an in-line type that is attached to the printing device 20. In accordance with an exemplary embodiment, communications between the printing device 20 and the in-line spectrophotometer 411, for example, can be done seamlessly with little or no human intervention (for example, hand held devices require a human to manually scan the printed output using the handheld device in a manual fashion).

In accordance with an exemplary embodiment, the in-line spectrophotometer or colorimeter 411 (FIG. 4), for example, can be one or more inline color sensors (not shown), which are located in the paper path, and which feeds information to the CPU 401 for processing. The information received by the CPU (or processor) 401 from the in-line spectrophotometer or colorimeter 411 can be used to determine if one or more of the color patches has failed, for example, at least one of the printed color patches as read by the inline spectrophotometer or colorimeter 411 does not match a target color and/or the color quality is not within a desired target color data (or range).

In accordance with an exemplary embodiment, the target color can include, for example, a color gamut or gradient, such as Adobe RGB saturation, Adobe RGB perceptual, Adobe Wide-gamut RGB color space, etc. In accordance with an exemplary embodiment, for each of the target colors, color gamut, and/or color gradients, a profile table is preferably hosted on the client computer 30. However, the profile table can also be hosted on the server 10 and/or the printer 20. In accordance with an exemplary embodiment, the target color data can be expressed by a listing of each of the patches (n number of patches) and a corresponding color target. In accordance with an exemplary embodiment, the corresponding color target can be expressed, for example, in terms of L*target(n), a*target(n), b*target(n) for each of n number of patches. For example, the color quality of a printer 20, for example, can be calculated using the following formula:

$$\Delta E_n = \sqrt{\begin{pmatrix} (L*_{ntarget} - L*_{measured})^2 + \\ (a*_{target} - a*_{measured})^2 + \\ (b*_{target} - b*_{measured})^2 \end{pmatrix}}$$

$$\text{Color quality } (\Delta E) = \frac{\left(\sum_{n=0}^{m} \Delta E_n\right)}{m}$$

Figure 18:
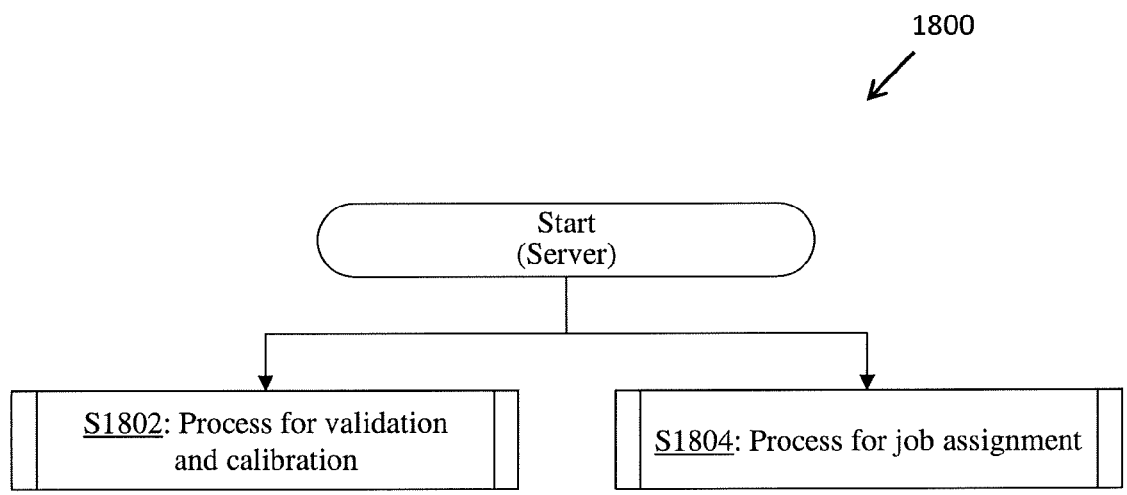
FIG. 18 is a flow chart illustrating a process for validation and calibration and job assignment on the server in accordance with an exemplary embodiment.

FIG. 18 is a flow chart 1800 illustrating a process for validation and calibration and job assignment on the server 10 in accordance with an exemplary embodiment. In accordance with an exemplary embodiment, the present disclosure receives a print job and registers the print job in the print queue 211 of a server 10, for example, a print server. In accordance with an exemplary embodiment, the server 10 can determine that the job is be to split and target printing devices to perform the criteria of validation and calibration.

As shown in FIG. 18, a CPU, for example, the Processing Unit 1 201 of server 10 can determine if the received print job from a customer 32, for example, should proceed to step S1802 for validation and calibration of target (destination) printer(s) 20, and/or step S1804 for a job assignment to a plurality of printers 20 amongst the plurality of printers in, for example, a print shop 14. In accordance with an exemplary embodiment, the Processing unit 1 201 of the server 10 can perform an assessment, if the job needs to be split to meet the requested schedule of the buyer 32, for example, to meet a buyer's job request schedule. In addition, if the job is to be split, and the job requires, for example, a certain degree of print quality, for a color print job, the Processing Unit 1 201 of the server can filter printing devices 20 having an in-line spectrophotometer or colorimeter 411 to perform the split job from printers or printing devices 20 that do not include an in-line spectrophotometer or colorimeter 411 as disclosed herein.

Figure 19:
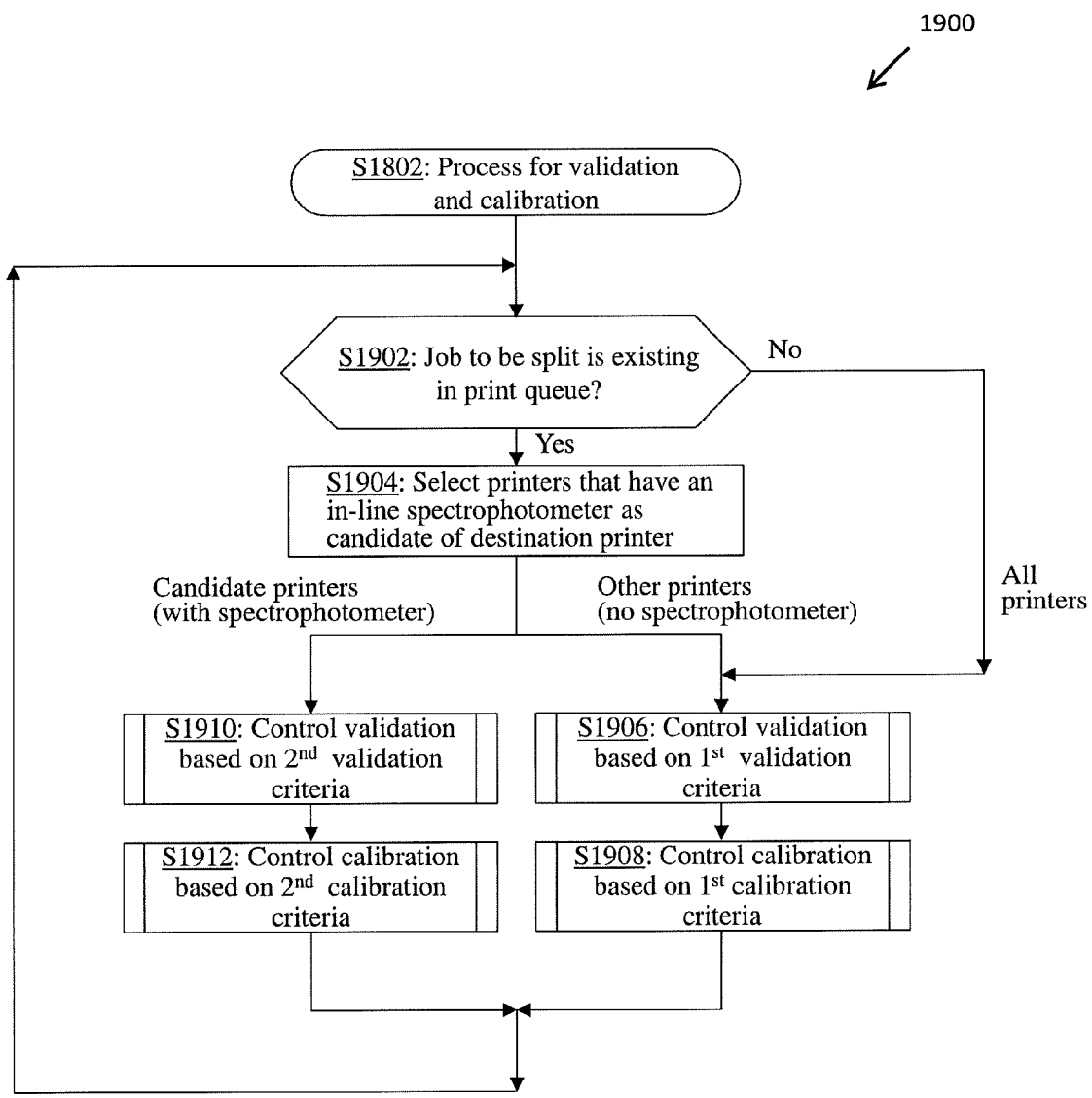
FIG. 19 is a flow chart illustrating the process for validation and calibration for a split job in accordance with an exemplary embodiment.

FIG. 19 is a flow chart 1900 illustrating the process for validation and calibration S1802, which can be executed or performed on the server (or print server) 10 for a print job, which is to be split (i.e., a split job), and wherein the split job is existing in the print queue 211 of the server 10 in accordance with an exemplary embodiment. As shown in FIG. 19, in step S1902, a determination is made, if an existing job registered in the print queue of the server 10 is a split job. In accordance with an exemplary embodiment, for example, if the existing job in the print queue 211 is a split job, the process continues to step S1904, wherein in step S1904, one or more printers 20 having an in-line spectrophotometer 411 can be filtered or determined to be candidates as destination printers 20 for the split job as disclosed herein.

In accordance with an exemplary embodiment, if the existing print queue 211 of the server 10 has a split job as determined in step S1902, which may require a certain degree of print quality, in step S1904, printers 20 having an in-line spectrophotometer 411 can be selected as candidate printers 20. In step S1910, each of the candidate printers 20 can perform a control validation based on a second ($2^{nd}$) criteria and in step S1912, a control calibration based on the second ($2^{nd}$) calibration criteria can be performed. In accordance with an exemplary embodiment, the validation and the calibration as performed in steps S1910 and S1912 based on the second ($2^{nd}$) criteria can be performed in series or parallel as disclosed herein.

In accordance with an exemplary embodiment, alternatively, if there are no jobs existing in the print queue 211 to be split, the Processing Unit 1 201 the process continues to steps S1906 and S1908, wherein each of the printers 20, which can include printers 20 having in-line spectrophotometers or colorimeters 411, and printers 20 without in-line spectrophotometers or colorimeters 411 can control validation and calibration based on a first ($1^{st}$) validation criteria and a first ($1^{st}$) calibration criteria, respectively as disclosed herein. As shown in FIG. 19, for example, the process continues to step S1906 wherein a control validation based on a first (1st) validation criteria can be performed, and step S1908, where a control calibration based on the first ($1^{st}$) calibration criteria. In accordance with an exemplary embodiment, the control validation and control calibration based the first ($1^{st}$) criteria (steps S1906 and S1908) can be performed in series or parallel as disclosed herein.

Figure 20:
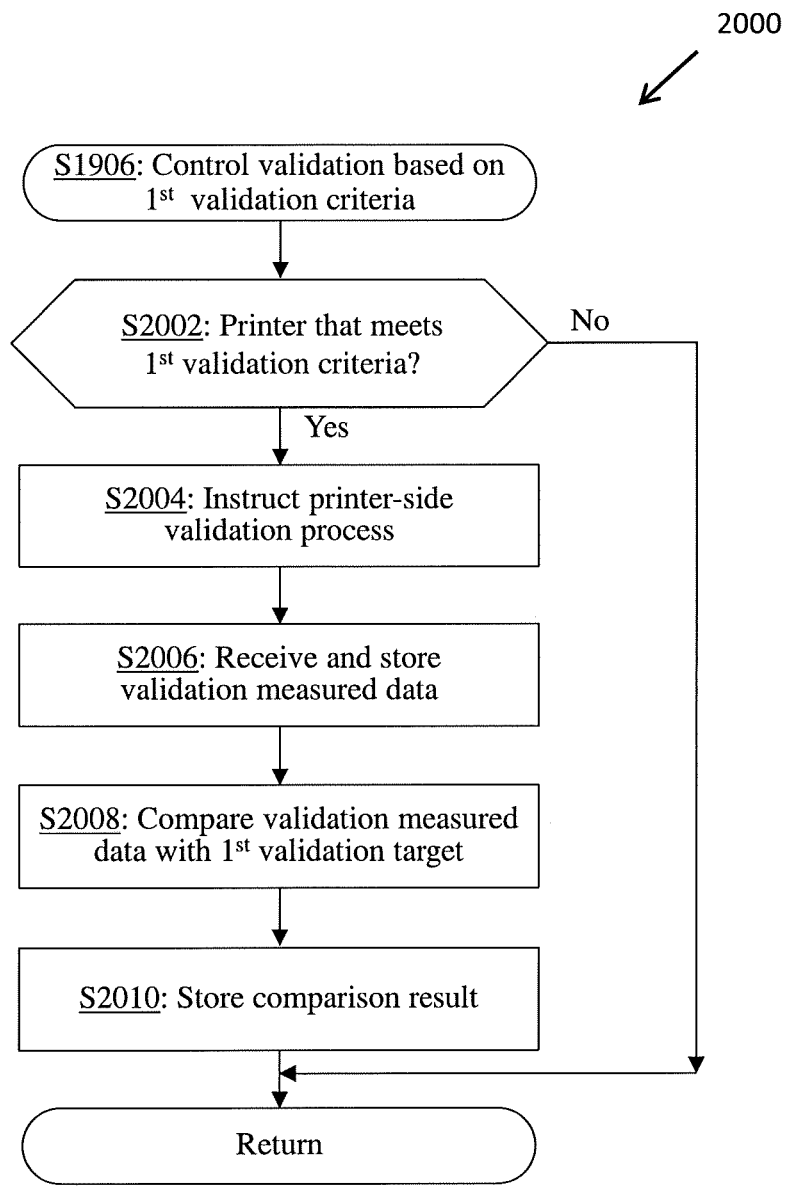
FIG. 20 is a flow chart illustrating a process for validation based on a first ($1^{st}$) criterion in accordance with an exemplary embodiment.

FIG. 20 is a flow chart 2000 illustrating the process (step S1906) for control validation based on a first ($1^{st}$) criteria for all printers 20, which includes printers 20 having an in-line spectrophotometer (or colorimeter) 411 and printers 20 without an in-line spectrophotometer (or colorimeter) 411 in accordance with an exemplary embodiment. As shown in FIG. 20, step S1906 relates to the control validation process based on the first ($1^{st}$) validation criteria. In step S2002, the server 10 can determine if the target printer 20 meets the first ($1^{st}$) validation criteria. If the target printer 20 does not meet the first ($1^{st}$) validation criteria, for example, a predetermined print count and/or time period (for example, term) since (or after) a prior color calibration, the target printer 20 does not execute the validation process as shown in FIG. 20.

In accordance with an exemplary embodiment, if the target printer 20 meets the first ($1^{st}$) validation criteria, for example, the print count and/or time period since the last color calibration, for example, has been exceeded, the print server 10 can instruct the printer 20 in step 52004 to perform a printer-side validation process by printing a color patch chart(s) on the target printer 20. In accordance with an exemplary embodiment, since the printer 20 does not include an in-line spectrophotometer (or colorimeter) 411, the color validation of the printer 20 can be performed by validation processes, which can include, for example, printing a plurality of color patches (or validation print stripes) on one or more sheets of a print media 512 (FIG. 5) by the target printer 20, and reading the color patches by another printer (or printing device) 20 having an in-line spectrophotometer or colorimeter 411, or by handheld or portable colorimeter (not shown). In step S2006, the server 10 receives and stores the validation measured data from the target printer 20. In step S2008, the Processing Unit 1 201 of the server 10 can compare the measured validation data with a first ($1^{st}$) validation target. In step S2010, the comparison of the measured validation data with the first ($1^{st}$) validation target is stored on the server 10, for example, in the memory 202 of the server 10.

Figure 21:
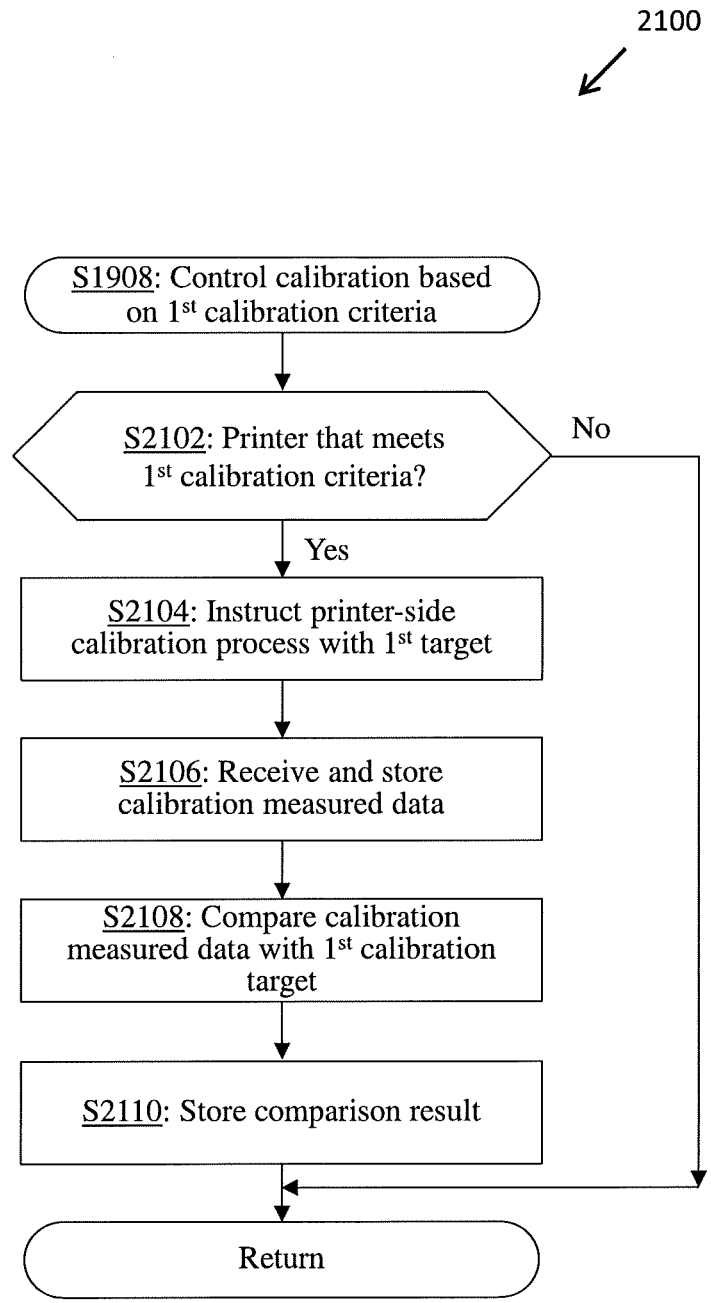
FIG. 21 is a flow chart illustrating a process for calibration based on a first (1st) criterion in accordance with an exemplary embodiment.

FIG. 21 is a flow chart 2100 illustrating a process for calibration based on the first ($1^{st}$) criteria in accordance with an exemplary embodiment. As shown in FIG. 21, in step S1908, the server 10 can perform a control calibration based on the first ($1^{st}$) calibration criteria on the one or more target printers 20. In step S2102, if the server 10 determines that the target printer meets the first ($1^{st}$) calibration criteria, which can be for example, a print count, a time period (or term), and color quality (ΔE) since the last color calibration was performed, the process continues to step S2104. In accordance with an exemplary embodiment, the Processing Unit 1 201 of the server 10 can be configured to compare the measured calibration data with a first ($1^{st}$) calibration target or color quality (i.e., ΔE), for example, a corresponding color target (ΔE), which can be, for example, the validation of the target printer 20 within plus or minus X (for example, ±7) percentage of the color target. If the target printer 20 does not meet the first ($1^{st}$) calibration criteria, the target printer 20 does not execute the color calibration process as set forth in FIG. 21.

If the target printer 20 meets the first ($1^{st}$) calibration criteria, in step S2104, the print server 10 can instruct the printer 20 to perform a color calibration with a first ($1^{st}$) target (color target) by printing the color patch chart(s), reading the color patch chart(s) by an in-line spectrophotometer or colorimeter 411 on the printer 20, or alternatively, by another printer (or printing device) 20 having an in-line spectrophotometer or colorimeter 411, or by handheld or portable colorimeter (not shown) for a printer 20 without an in-line spectrophotometer or colorimeter 411, calculating the color parameter based on the measured data of the printed color patch chart(s) and received color calibration target, reprinting the color patch chart(s), reading the reprinted color patch chart(s) by the in-line spectrophotometer or colorimeter 411, by another printer (or printing device) 20 having an in-line spectrophotometer or colorimeter 411, or by handheld or portable colorimeter (not shown), and sending the measured validation data on the reprinted color patch chart(s) to the print server 10. In step S2106, the server 10 receives and stores the measured calibration data from the printer 20. In step S2108, the Processing Unit 1 201 of the server 10 can compare the measured calibration data with the first ($1^{st}$) calibration target or color quality (i.e., ΔE), for example, a corresponding color target (ΔE), for example, is the validation of the target printer 20 within plus or minus X (for example, ±7) percentage of the color target. In step S2110, the comparison is stored in the memory 202 of the server 10.

Figure 22:
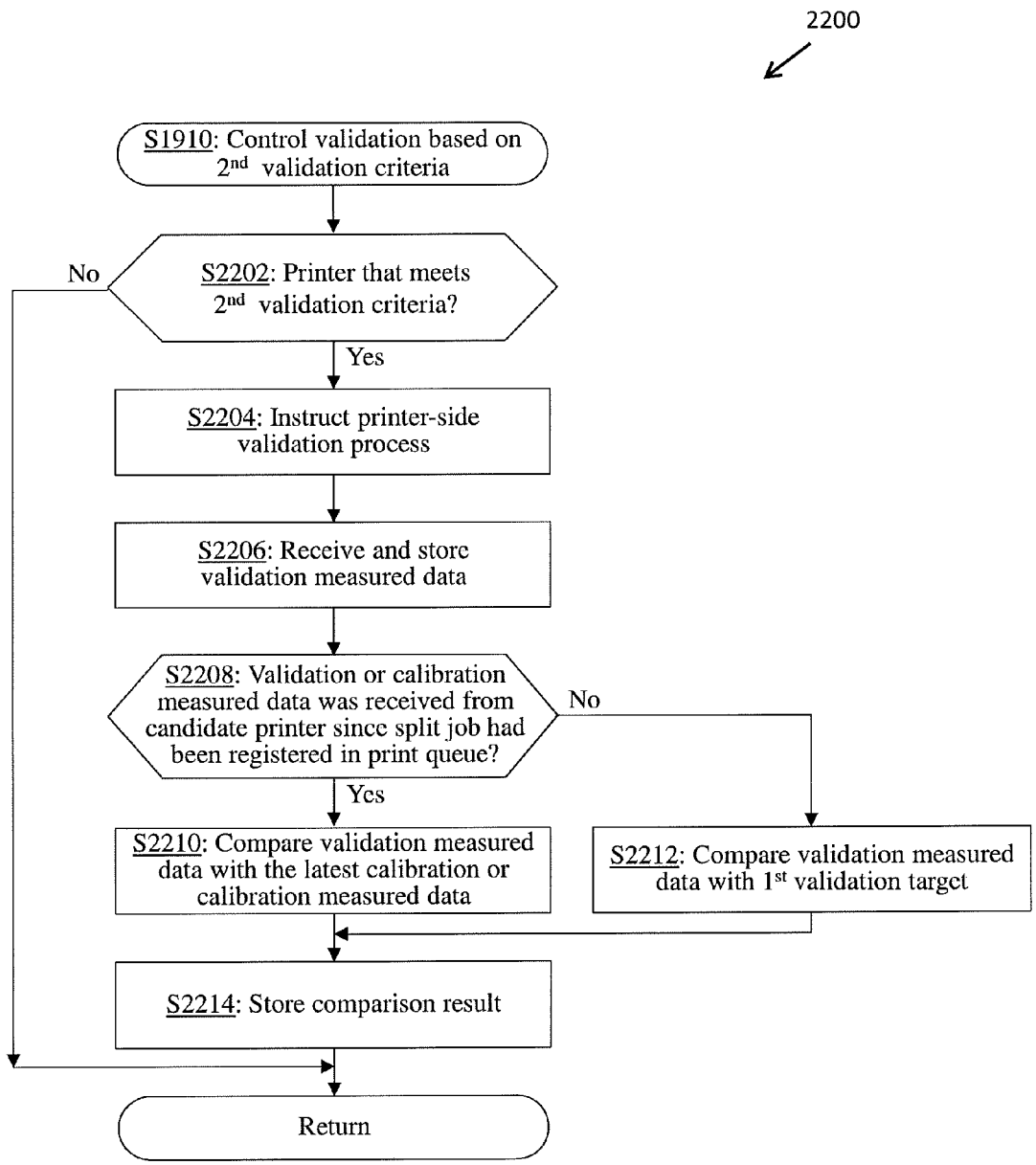
FIG. 22 is a flow chart illustrating a process for validation based on a second (2nd) criterion in accordance with an exemplary embodiment.

FIG. 22 is a flow chart 2200 illustrating a process for validation based on a second (2nd) validation criteria in accordance with an exemplary embodiment. As shown in S1910, the server 10 can instruct the printers or printing devices 20 having in-line spectrophotometers or colorimeters 411 and which are candidates for the split job to perform a control validation based on a second ($2^{nd}$) criteria. For example, in accordance with an exemplary embodiment, the second ($2^{nd}$) criteria can be based on a page count and/or time period (or term) since the last color calibration was performed by the target printer 20. In step S2202, the server 10 determines if the target printer 20 meets the second ($2^{nd}$) validation criteria. If the printer 20 does not meet the second ($2^{nd}$) validation criteria, the printer 20 does not perform the validation process as set forth in FIG. 22.

In accordance with an exemplary embodiment, if the target printer 20 meets the validation second ($2^{nd}$) criteria in step S2202, in step S2204, the target (or candidate) printer 20 can be instructed by the server 10 to perform a color validation process by printing one or more color patch charts. In accordance with an exemplary embodiment, the target printer 20 automatically measures the printed color patch charts using the in-line spectrophotometer or colorimeter 411 and sends the measured validation data to the server 10. In step S2206, the Processing Unit 1 201 of the server 10 receives and stores the measured validation data from step S2204.

In accordance with an exemplary embodiment, in step S2208, the Processing Unit 1 201 of the server 10 can determine if measured validation or calibration data has been received from another target (or candidate) printer 20 since the split job was registered in the print queue 211 of server 10. If measured validation or calibration data has not been received since the split job was received in the print queue 211 from another target printer, in step S2212, the measured validation data is compared with a first ($1^{st}$)

validation target. In accordance with an exemplary embodiment, if there already exists a validation measured data from another printer since the split job has been registered in the print queue, in step S2210, the measured validation or calibration data can be compared with the measured validation or calibration data from the another target printer 20. In step S2214, the comparison between the target printer 20 and the another target printer 20, or the target printer and the first ($1^{st}$) validation target are stored on the server 10.

Figure 23:
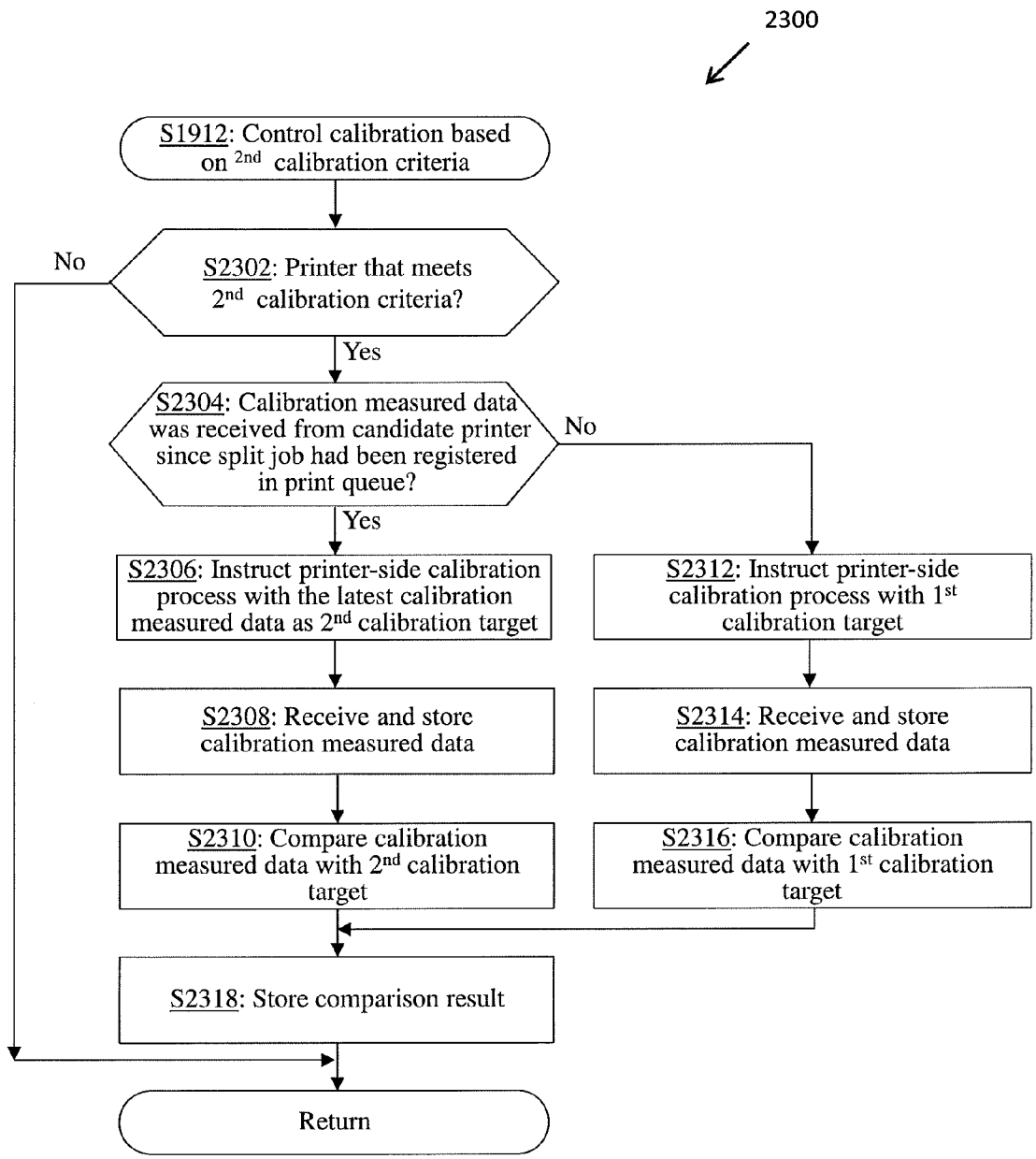
FIG. 23 is a flow chart illustrating a process for calibration based on a second ($2^{nd}$) criterion in accordance with an exemplary embodiment.

FIG. 23 is a flow chart 2300 illustrating a process for calibration based on the second ($2^{nd}$) criteria in accordance with an exemplary embodiment. In step S1912, the server 10 will request that the target printer 20 perform a calibration based on the second ($2^{nd}$) criteria, which can be for example, a print count, a time period (or term), and color quality (ΔE) since the last color calibration was performed. In accordance with an exemplary embodiment, the server 10 can be configured to receive and store measured calibration data with a second ($2^{nd}$) calibration target, and can compare the calibration measured data with the second ($2^{nd}$) calibration target or color quality (i.e., ΔE), for example, a corresponding color target (ΔE), which can be, for example, the validation of the target printer 20 within plus or minus X (±X, for example, ±5) percentage of the color target. In step S2302, if the target printer 20 does not meet that second ($2^{nd}$) calibration criteria as disclosed herein, the process continues to the end, where target printer 20 does not execute the calibration as set forth in FIG. 23.

In accordance with an exemplary embodiment, in order to determine if the target printer 20 does meet that $2^{nd}$ calibration criteria, in step S2304, if the server 10 has already received measured calibration data from another printer 20, wherein the another printer 20 is one of the candidate printers 20 having an in-line spectrophotometer or colorimeter 411, the Processing Unit 1 201 of the server 10 can instruct the target printer 20 in step S2306 to perform the calibration process with the latest calibration measured data as the second ($2^{nd}$) calibration target by printing one or more color patch charts, and automatically measures the printed color patch charts using the in-line spectrophotometer or colorimeter 411. The target printer (or candidate printer) 20 can then calculate the color parameter based on the measured data and received color calibration target. The one or more color patch charts are then reprinted, automatically measured by the in-line spectrophotometer or colorimeter 411, and measured validation data can be sent to the server 10. In step S2308, the server 10 receives and stores the measured calibration data with the second ($2^{nd}$) calibration target. In step S2310, the server 10 compares the calibration measured data with the second ($2^{nd}$) calibration target or color quality (i.e., ΔE), for example, a corresponding color target (ΔE), for example, is the validation of the target printer 20 within plus or minus X (±X, for example, ±5) percentage of the color target. In step 2318, the server 10 stores the comparison of the measured calibration data and the second ($2^{nd}$) calibration target.

In accordance with an exemplary embodiment, if no measured calibration data is saved and/or registered in the server 10, the process continues to step 2312, where the server 10 can instruct the target printer 20 to perform a calibration process with a first ($1^{st}$) calibration target by printing one or more color patch charts, and automatically measures the printed color patch charts using the in-line spectrophotometer or colorimeter 411. The target printer (or candidate printer) 20 can then calculate the color parameter based on the measured data and received color calibration target. The one or more color patch charts are then reprinted, automatically measured by the in-line spectrophotometer or colorimeter, and measured validation data can be sent to the server 10. In step S2314, the server 10 receives and stores the measured calibration data with the second ($2^{nd}$) calibration target. In step S2316, the server 10 compares the measured calibration data with the first ($1^{st}$) calibration target. In step 2318, the server 10 stores the comparison of the measured calibration data and the first ($1^{st}$) calibration target.

Figure 24:
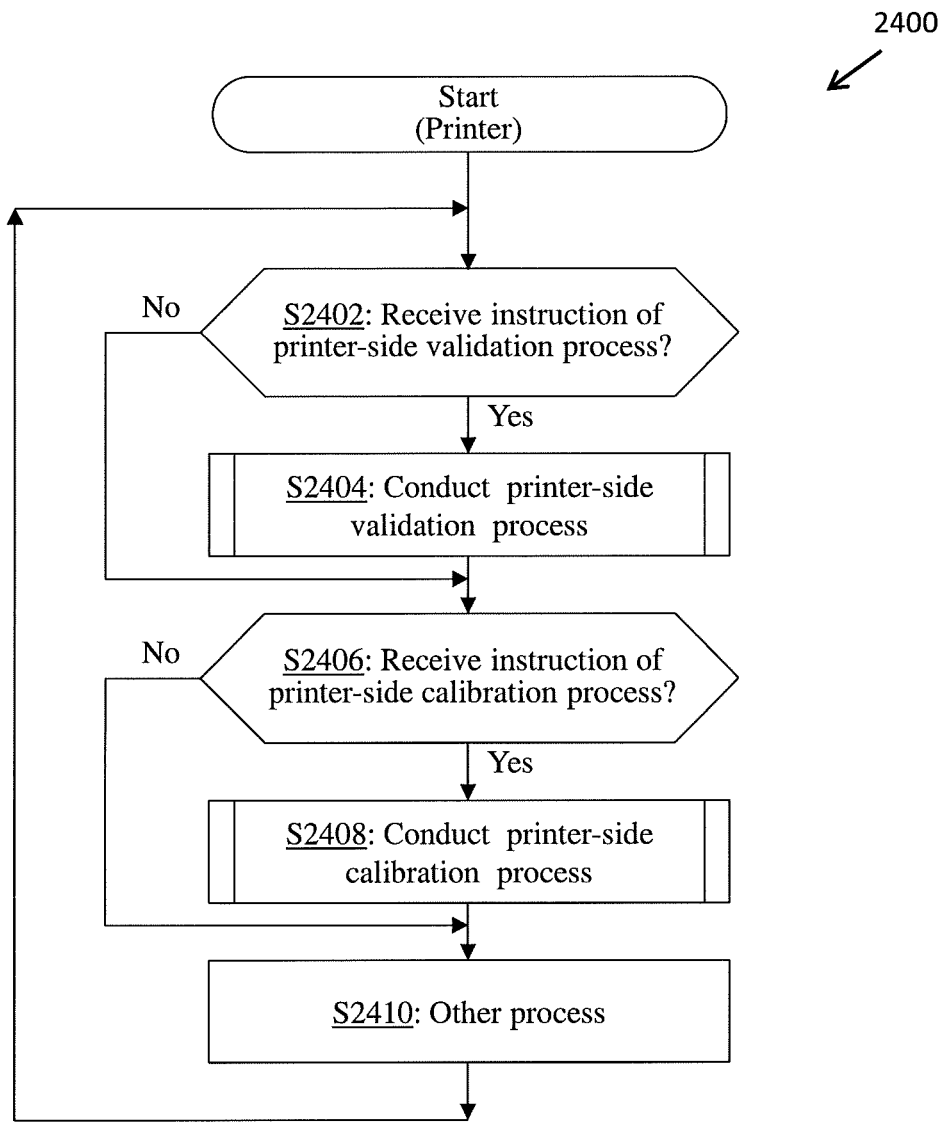
FIG. 24 is a flow chart illustrating a process executed on a printer in accordance with an exemplary embodiment.

FIG. 24 is a flow chart 2400 illustrating a process executed on a printer 20 in accordance with an exemplary embodiment. As shown in FIG. 24, in step S2402, if a target printer 20 can receive an instruction to execute or perform a validation process, in step S2404, the target printer 20 conducts a validation process as disclosed herein and the process continues to step S2406. As shown in FIG. 24, if the target printer 20 does not receive instructions to perform a validation process in step 2402, the process continues to step S2406.

In step S2406, if a target printer 20 receives an instruction to execute or perform a calibration process, in step S2408, the target printer 20 conducts a calibration process as disclosed herein and the process continues to step S2410, which ends the process and/or another step and/or process as disclosed herein can be performed or executed. As shown in FIG. 24, if the target printer 20 does not receive instructions to perform a calibration process in step S2406, the process continues to step S2410.

In accordance with an exemplary embodiment, the server 10 can be configured to executes a process, for example, by receiving from each filtered printer 20, for example, at least two printers 20, a result corresponding to the color validation process by the in-line spectrophotometer or colorimeter 411, and comparing the results corresponding to the color validation process from the each filtered at least two printers 20 to determine at least two candidates as destination printers 20 to receive the split job based on the compared results, which correspond to the color validation process from the each filtered at least two printers 20. In addition, if the at least two candidates as destination printers 20 of the plurality of printers 20 meet a predetermined print quality as set forth in the request relating to the print job, the processor (Processing Unit) 201 of the server 10 can instruct the at least two destination printers to conduct the split print job. For example, in accordance with an exemplary embodiment, the predetermined print quality can be a color quality exceeding a predetermined print quality target.

In accordance with an exemplary embodiment, when the at least two candidates as destination printers 20 of the plurality of printers 20 do not meet a predetermined print quality as set forth in the request relating to the print job, the processor 201 of the server 10 can further instruct the at least two candidates as destination printers to conduct a color calibration process by using the in-line spectrophotometer 411. The processor on the server 10 can be configured to receive, from the filtered at least two printers 20, a result corresponding to the color calibration process by the in-line spectrophotometer 411, and determine the at least two destination printers 20 for the print job, based on the result corresponding to the color calibration process. In accordance with an exemplary embodiment, the processor 201 (or server 10) can instruct the at least two destination printers 20 to conduct the split print job.

In accordance with an exemplary embodiment, when the print job does not have a predetermined print quality, the processor 201 can be configured to instruct two or more printers 20 from the plurality of printers 20 to conduct a color validation process, and receive a result corresponding to the color validation process from the two or more printers 20. The processor 201 can then compare the results corresponding to the color validation process from the two or more printers of the plurality of printers, and determine at least two candidates as destination printers 20 to receive the split job based on the compared color validation process from the two or more printers 20 of the plurality of printers 20. In accordance with an exemplary embodiment, for example, the processor 201 can be configured to send, to the each filtered at least two printers 20, data corresponding to a document to be printed and data corresponding to a color chart to be used for the color validation process.

Figure 25:
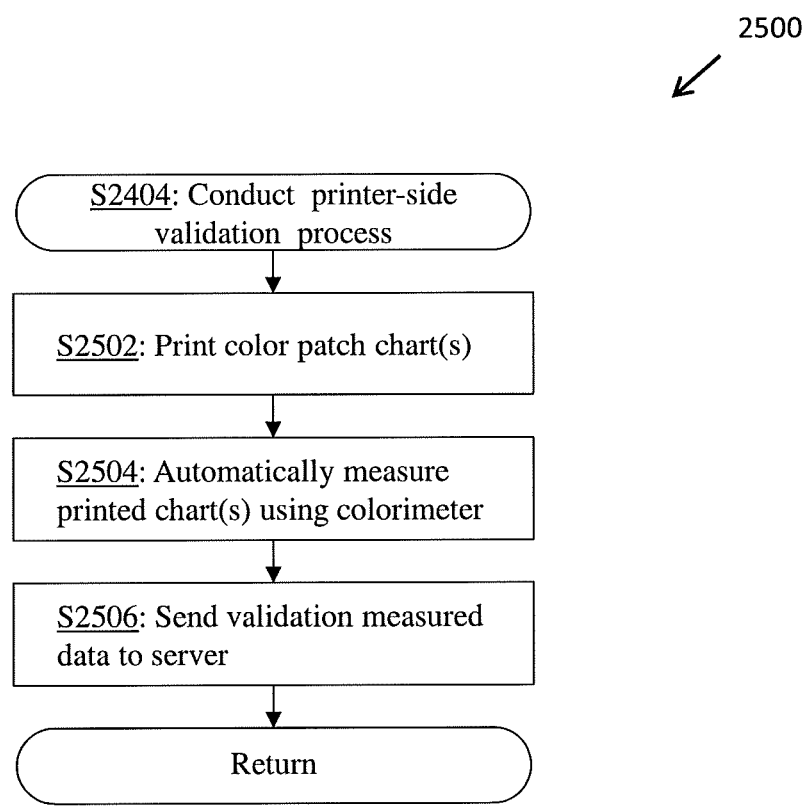
FIG. 25 is a flow chart illustrating a printer-side validation process in accordance with an exemplary embodiment.

FIG. 25 is a flow chart 2500 illustrating a printer-side validation process in accordance with an exemplary embodiment. As shown in FIG. 25, the printer side validation process S2404 can include as disclosed herein, printing one or more color patch charts (step S2502), automatically measuring the printed one or more color patch charts with the in-line spectrophotometer or colorimeter 411 on the target printer 20 (step S2504), and sending the validation measured data to the server 10 (step S2506).

Figure 26:
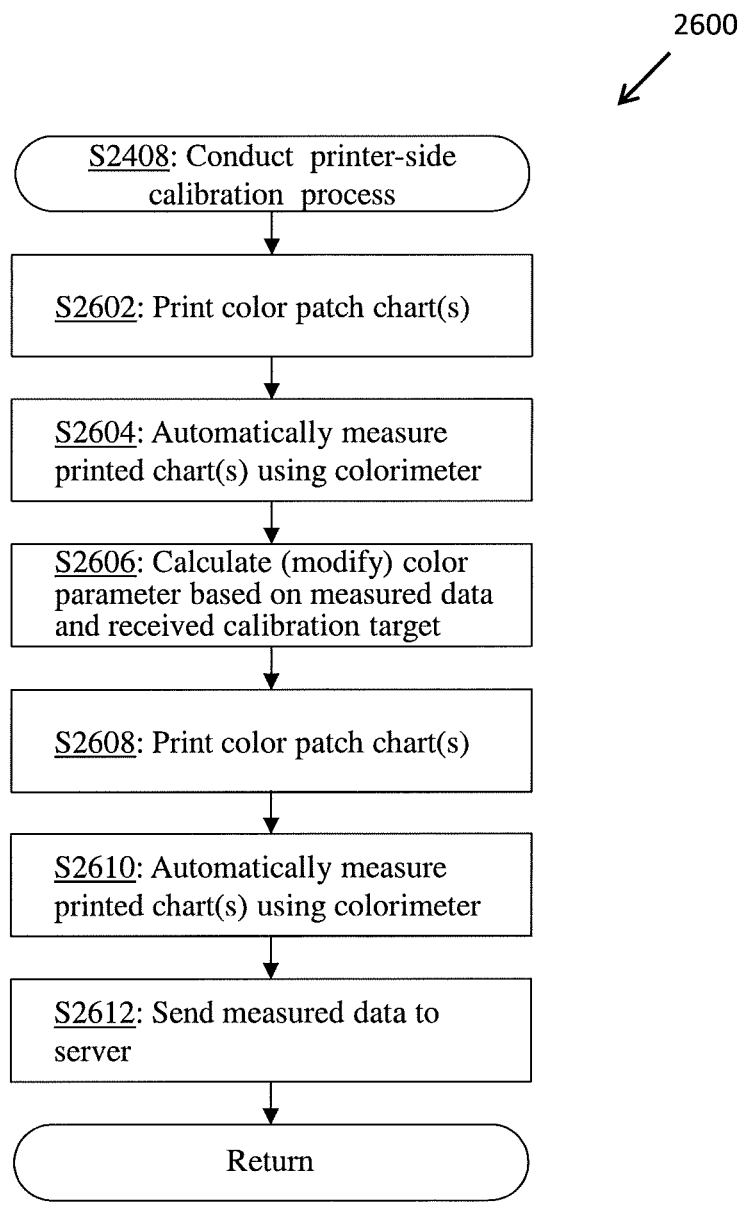
FIG. 26 is a flow chart illustrating a printer-side calibration process in accordance with an exemplary embodiment.

FIG. 26 is a flow chart 2600 illustrating a printer-side calibration process in accordance with an exemplary embodiment. As shown in FIG. 26, the printer side calibration process S2408 can include as disclosed herein, printing one or more color patch charts (step S2602), automatically measuring the printed one or more color patch charts with the in-line spectrophotometer or colorimeter 411 on the target printer 20 (step S2604), calculating or modifying one or more color parameters based on the measured data and received calibration target on the target printer 20 (step S2606), reprinting the one or more color patch charts (step S2608), automatically measuring the reprinted one or more color patch charts with the in-line spectrophotometer or colorimeter 411 on the target printer 20 (step S2610), and sending the validation measured data to the server 10 (step S2612).

FIG. 27 is a chart 2700 showing calibration criteria and validation criteria, which in accordance with an exemplary embodiment. As shown in FIG. 27, for example, the validation $1^{st}$ criteria 2710 and the validation $2^{nd}$ criteria 2720 for each of the one or more printers 20 can be based on a print count and term (for example, validation cycle). In addition, the calibration $1^{st}$ criteria 2730 and the calibration $2^{nd}$ criteria 2740 can be based on print count, term (for example, validation cycle), and having a $1^{st}$ calibration target or color quality (i.e., ΔE), for example, a corresponding color target (ΔE), for example, is the validation of the target printer 20 within plus or minus (±5) or (±7) percentage of the color target. In accordance with an exemplary embodiment, the second ($2^{nd}$) criterion causes color calibration and/or color validation at each of the at least two printers to be performed earlier than the first ($1^{st}$) criterion. In addition, the color quality of the second criterion can be greater than the color quality of first criterion, for example, plus or minus 5 (±5) percent of the color target for the second criterion, versus plus or minus 7 (±7) percent of the color target for the first criterion.

In accordance with an exemplary embodiment, a non-transitory computer readable recording medium stored with a computer readable program code is disclosed for ensuring uniform level of color of distributed print jobs among a plurality of printers in a print shop system, wherein a server is configured to be connected to a plurality of printers, each of the plurality of printers configured to conduct color calibration based on a first criterion, the computer readable program code configured to execute a process comprising: receiving a print job on the server; determining whether the received print job is a split job which can be split into at least two printers among the plurality of the printers; and instructing, in response to receiving the split job, to the at least two printers that color calibration is conducted based on a second criterion, wherein the second criterion causes color calibration at each of the at least two printer to be performed earlier than the first criterion.

The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A server for ensuring uniform level of color of distributed print jobs among a plurality of printers, wherein each of the plurality of printers is configured to conduct color validation and/or color calibration based on a first criterion, the server comprising:
 a processor configured to:
  receive, from a client computer, a request relating to a print job;
  determine whether the received print job is a split job, which can be split amongst the plurality of the printers;
  filter at least two printers each having an in-line spectrophotometer from the plurality of printers; and
  instruct to the each filtered at least two printers so that color validation and/or color calibration is performed based on a second criterion by using the in-line spectrophotometer, wherein the second criterion causes color validation and/or color calibration at each of the each filtered at least two printers to be performed earlier than the first criterion.

2. The server of claim 1, wherein the processor is further configured to:
 receive, from the each filtered at least two printers, a result corresponding to the color validation process by the in-line spectrophotometer;
 compare the results corresponding to the color validation process from the each filtered at least two printers; and
 determine at least two candidates as destination printers to receive the split job based on the compared results corresponding to the color validation process from the each filtered at least two printers.

3. The server of claim 2, wherein when the at least two candidates as destination printers of the plurality of printers meet a predetermined print quality as set forth in the request relating to the print job, further comprising:

by the processor:
instruct the at least two destination printers to conduct the split print job.

4. The server of claim 3, wherein the predetermined print quality is a color quality exceeding a predetermined print quality target.

5. The server of claim 4, wherein when the at least two candidates as destination printers of the plurality of printers do not meet a predetermined print quality as set forth in the request relating to the print job, further comprising:
by the processor:
instruct the at least two candidates as destination printers to conduct a color calibration process by using the in-line spectrophotometer;
receive, from the filtered at least two printers, a result corresponding to the color calibration process by the in-line spectrophotometer;
determine the at least two destination printers for the print job, based on the result corresponding to the color calibration process; and
instruct the at least two destination printers to conduct the split print job.

6. The server of claim 1, wherein the print job does not have a predetermined print quality, the processor is configured to:
instruct two or more printers from the plurality of printers to conduct a color validation process;
receive, from the two or more printers from the plurality of printers, a result corresponding to the color validation process;
compare the results corresponding to the color validation process from the two or more printers of the plurality of printers; and
determine at least two candidates as destination printers to receive the split job based on the compared color validation process from the two or more printers of the plurality of printers.

7. The server of claim 2, wherein the processor is configured to:
send, to the each filtered at least two printers, data corresponding to a document to be printed and data corresponding to a color chart to be used for the color validation process.

8. The server of claim 1, wherein the second criterion for the color validation is a print count or a time period after conducting a prior color calibration.

9. The server of claim 1, wherein the second criterion for the color calibration is a print count or a time period after conducting a prior color calibration or a color quality calculated based on the validation result.

10. A system for ensuring uniform level of color of distributed print jobs among a plurality of printers, the system comprising:
at least two printers, each of the at least two printers comprising:
an in-line spectrophotometer configured to read a color validation chart, the color validation chart having one or more color patches; and
a processor configured to:
acquire a validation result on a color validation chart from the in-line spectrophotometer, wherein the validation result compares a color accuracy of each of the one or more color patches from the color validation chart to a target color; and
a server which is connected to the plurality of printers, the server comprising:
a processor configured to:
receive a request relating to a print job;
determine whether the received print job is a split job, which can be split amongst the plurality of the printers;
instruct to the at least two printers so that color validation and/or color calibration is performed based on a second criterion by using the in-line spectrophotometer, wherein the second criterion causes color validation and/or color calibration at each of the each filtered at least two printers to be performed earlier than the first criterion.

11. The system of claim 10, wherein the processor of the server is configured to:
receive, from the each filtered at least two printers, a result corresponding to the color validation process by the in-line spectrophotometer;
compare the results corresponding to the color validation process from the each filtered at least two printers; and
determine at least two candidates as destination printers to receive the split job based on the compared results corresponding to the color validation process from the each filtered at least two printers.

12. The system of claim 10, comprising:
a client computer configured to send the print job to the server.

13. The system of claim 11, wherein when the at least two candidates as destination printers of the plurality of printers meet a predetermined print quality as set forth in the request relating to the print job, further comprising:
by the processor of the server:
instruct the at least two destination printers to conduct the split print job.

14. The system of claim 13, wherein the predetermined print quality is a color quality exceeding a predetermined print quality target.

15. The system of claim 14, wherein when the at least two candidates as destination printers of the plurality of printers do not meet a predetermined print quality as set forth in the request relating to the print job, further comprising:
by the processor of the server:
instruct the at least two candidates as destination printers to conduct a color calibration process by using the in-line spectrophotometer;
receive, from the filtered at least two printers, a result corresponding to the color calibration process by the in-line spectrophotometer;
determine the at least two destination printers for the print job, based on the result corresponding to the color calibration process; and
instruct the at least two destination printers to conduct the split print job.

16. The system of claim 10, wherein when the print job does not have a predetermined print quality, the processor of the server is configured to:
instruct two or more printers from the plurality of printers to conduct a color validation process;
receive, from the two or more printers from the plurality of printers, a result corresponding to the color validation process;
compare the results corresponding to the color validation process from the two or more printers of the plurality of printers; and
determine at least two candidates as destination printers to receive the split job based on the compared color validation process from the two or more printers of the plurality of printers.

17. A method for ensuring uniform level of color of distributed print jobs among a plurality of printers, wherein each of the plurality of printers is configured to conduct color validation and/or color calibration based on a first criterion, the method comprising:
    receiving, from a client computer, a request relating to a print job;
    determining whether the received print job is a split job, which can be split amongst the plurality of the printers;
    filtering at least two printers each having an in-line spectrophotometer from the plurality of printers; and
    instructing to the each filtered at least two printers so that color validation and/or color calibration is performed based on a second criterion by using the in-line spectrophotometer, wherein the second criterion causes color validation and/or color calibration at each of the each filtered at least two printers to be performed earlier than the first criterion.

18. The method of claim 17, comprising:
    receiving, from the each filtered at least two printers, a result corresponding to the color validation process by the in-line spectrophotometer;
    comparing the results corresponding to the color validation process from the each filtered at least two printers;
    determining at least two candidates as destination printers to receive the split job based on the compared results corresponding to the color validation process from the each filtered at least two printers; and
    wherein when the at least two candidates as destination printers of the plurality of printers meet a predetermined print quality as set forth in the request relating to the print job, further comprising:
        instructing the at least two destination printers to conduct the split print job.

19. The method of claim 18, wherein when the at least two candidates as destination printers of the plurality of printers do not meet a predetermined print quality as set forth in the request relating to the print job, further comprising:
    instructing the at least two candidates as destination printers to conduct a color calibration process by using the in-line spectrophotometer;
    receiving, from the filtered at least two printers, a result corresponding to the color calibration process by the in-line spectrophotometer;
    determining the at least two destination printers for the print job, based on the result corresponding to the color calibration process; and
    instructing the at least two destination printers to conduct the split print job.

20. A non-transitory computer readable recording medium stored with a computer readable program code configured to execute a process according to claim 17.

* * * * *